(12) United States Patent
Morningstar et al.

(10) Patent No.: US 11,574,326 B2
(45) Date of Patent: Feb. 7, 2023

(54) IDENTIFYING TOPIC VARIANCES FROM DIGITAL SURVEY RESPONSES

(71) Applicant: Qualtrics, LLC, Provo, UT (US)

(72) Inventors: Jamie Morningstar, Orem, UT (US); R. David Norton, Orem, UT (US); Andrew Carr, Provo, UT (US)

(73) Assignee: Qualtrics, LLC, Provo, UT (US)

( * ) Notice: Subject to any disclaimer, the term of this patent is extended or adjusted under 35 U.S.C. 154(b) by 240 days.

(21) Appl. No.: 16/394,759

(22) Filed: Apr. 25, 2019

(65) Prior Publication Data
US 2020/0342470 A1 Oct. 29, 2020

(51) Int. Cl.
*G06Q 30/02* (2012.01)
*G06Q 10/06* (2012.01)

(52) U.S. Cl.
CPC ....... *G06Q 30/0203* (2013.01); *G06Q 10/067* (2013.01)

(58) Field of Classification Search
None
See application file for complete search history.

(56) References Cited

U.S. PATENT DOCUMENTS

| | | | | |
|---|---|---|---|---|
| 8,577,884 B2* | 11/2013 | Poteet | .................. | G06Q 30/02 |
| | | | | 707/737 |
| 10,325,568 B2* | 6/2019 | Whiting | .................. | H04L 67/02 |
| 10,706,735 B2* | 7/2020 | Smith | .................. | G09B 7/00 |
| 2003/0018629 A1* | 1/2003 | Namba | .................. | G06F 16/355 |
| 2010/0153107 A1* | 6/2010 | Kawai | .................. | G06Q 10/04 |
| | | | | 704/240 |
| 2012/0042263 A1* | 2/2012 | Rapaport | .................. | G06Q 50/01 |
| | | | | 715/753 |
| 2014/0143026 A1* | 5/2014 | Nies | .................. | G06Q 10/06398 |
| | | | | 705/7.42 |
| 2014/0143157 A1* | 5/2014 | Jeffs | .................. | H04M 3/51 |
| | | | | 705/304 |
| 2015/0317382 A1* | 11/2015 | O'Malley | .................. | H04L 67/02 |
| | | | | 707/738 |
| 2017/0124174 A1* | 5/2017 | Starr | .................. | G06F 16/353 |
| 2017/0351653 A1* | 12/2017 | Ramlet | .................. | G06F 40/58 |

OTHER PUBLICATIONS

Identifying the perspectives for sustainability enhancement Bhanot, Neeraj; Rao, P Venkateswara; Deshmukh, S G. Journal of Advances in Management Research13.3: 244-270. Emerald Group Publishing Limited. (Year: 2016).*

* cited by examiner

*Primary Examiner* — Folashade Anderson
(74) *Attorney, Agent, or Firm* — Keller Preece PLLC

(57) ABSTRACT

This disclosure covers methods, systems, and computer-readable media that identify a topic variance from digital survey responses and provide a variety of functionalities to a digital survey system based on the topic variance (i.e., by modifying a digital survey reporting structure based on the topic variance). In certain embodiments, the disclosed systems analyze one or more sets of digital survey responses to generate one or more response models. Furthermore, the disclosed systems can analyze the one or more response models to identify a topic variance (e.g., an emerging topic, a change in trend for a topic, and/or a change in sentiment for a topic). Upon identifying a topic variance, the disclosed systems modify a digital survey reporting structure and/or generate notifications based on the identified topic variance.

20 Claims, 15 Drawing Sheets

IDENTIFYING TOPIC VARIANCES FROM DIGITAL SURVEY RESPONSES

BACKGROUND

Various institutions in a wide range of disciplines (e.g., business, government, and education) rely on digital surveys to gather critical information from survey audiences (e.g., customers, employees, citizens, and students) regarding a wide range of issues and topics. However, as digital content continues to proliferate, institutions receive a seemingly endless amount of information, for a wide range of issues and topics, from survey audiences. This increase in information and data from survey audiences complicates the tracking of information related to digital surveys. Specifically, the amount of data that is received on a daily even hourly basis presents a unique challenge to survey administrators because survey administrators are presented with a seemingly boundless amount of information and, often time, cannot process the amount of information to recognize significant feedback or information from their survey audiences.

In an attempt to recognize significant information from the survey responses gathered through digital surveys, some conventional digital survey systems provide administrators with reports that show responses overtime to attempt to demonstrate any significant information. However, reporting the seemingly endless amount of information received in response to digital surveys creates several drawbacks. For example, due to the amount of available information, conventional digital survey system reports are not adequate and are not able to demonstrate a wide variety of significant information from the response data from digital surveys. Moreover, conventional digital survey systems typically include specialized reports designed to visualize a particular known aspect related to response data; however, conventional digital survey systems have not the ability and therefore fail to recognize significant information that might be outside the scope of the designed reports. Furthermore, most conventional digital survey systems generate reports periodically (e.g., every week), and therefore, conventional digital systems often report significant information late and thus the information loses practical importance to an administrator. Accordingly, conventional digital survey systems often time fail to both recognize a wide variety of significant information, generate timely information, and enable the administrators to realize the potential of the large amount of gathered response information.

As a result of the inability to recognize a wide variety of significant information from the gathered information, conventional digital survey systems often utilize excessive computational resources to gather such amounts of information from digital surveys. This often results in an inefficient utilization of storage and processing resources because the large volume of data may be maintained on computing devices with little to no gain (e.g., a wide variety of significant information from survey responses may remain unnoticed or may not be acted upon). Additionally, some conventional digital survey systems may increasingly utilize computing resources to recognize significant information when more information is gathered while the ability to recognize a wide variety of significant information further diminishes because of the increase in available information.

In addition to data storage and processing inefficiencies, conventional digital survey systems often inefficiently utilize communication bandwidth by gathering information from survey audiences without enabling the administrators to realize the potential of the gathered information. For instance, by failing to recognize a wide variety of significant information from the large amount of gathered information, administrators often fail to notice or address significant feedback provided by survey audiences. Consequently, some conventional digital survey systems inefficiently utilize communication bandwidth between the conventional systems and survey audiences by failing to provide administrators with tools to notice or address a wide variety of feedback provided by the survey audiences.

Accordingly, conventional digital survey systems suffer from these and other disadvantages.

SUMMARY

This disclosure describes solutions to the foregoing problems with systems, methods, and non-transitory computer-readable media that process digital survey responses. For example, the disclosed systems analyze digital survey responses to identify one or more response variances (e.g., an emerging topic from a free form text responses) and provide various functionalities to a digital survey system based on the identified response variance. In some embodiments, the disclosed systems receive a first set of digital survey responses corresponding to a first time period and a second set of digital survey responses corresponding to a second time period. The systems analyze the first set of digital survey responses to generate a first response model for the first set of digital survey responses and analyze the second set of digital survey responses to generate a second response model for the second set of digital survey responses. Then, the disclosed systems analyze the first response model and the second response model to identify a variance. In addition, the disclosed systems can modify a digital survey reporting structure and/or generate notifications based on the identified variance.

By analyzing digital survey responses to identify a topic variance (e.g., an emerging topic) and providing a variety of functionalities based on the topic variance, the disclosed systems can identify a wide variety of significant information and enable survey administrators to utilize the large amounts of survey response data with increased efficiency and accuracy. The following description sets forth additional features and advantages of one or more embodiments of the disclosed systems and methods. In some cases, such features and advantages will be obvious to a skilled artisan from the description or may be learned by the practice of the disclosed embodiments.

BRIEF DESCRIPTION OF THE DRAWINGS

The detailed description is described with reference to the accompanying drawings in which.

DETAILED DESCRIPTION

Figure 1:
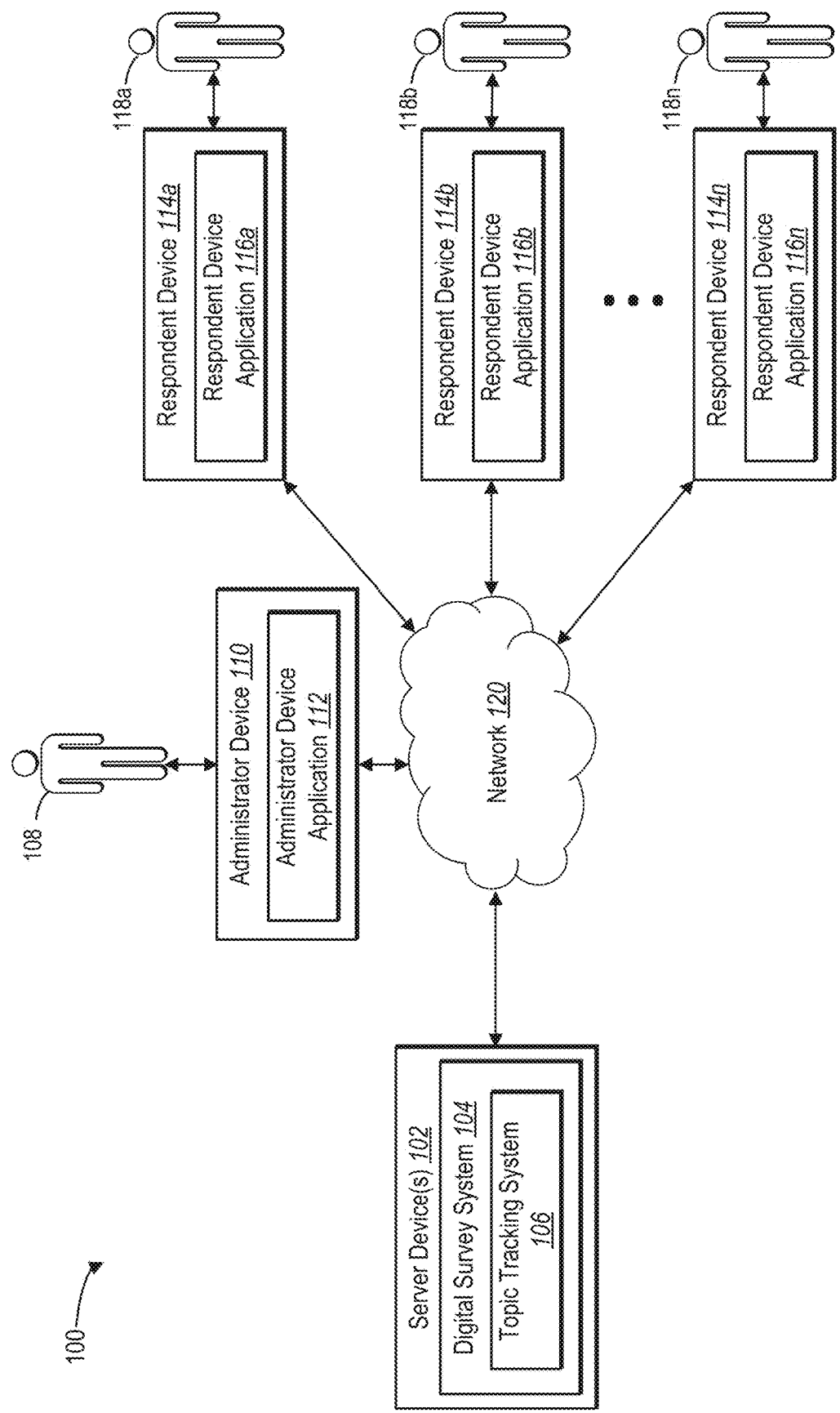
FIG. 1 illustrates a block diagram of an environment for implementing a topic tracking system in accordance with one or more embodiments.

This disclosure describes one or more embodiments of a topic tracking system that analyzes digital survey responses to identify a response variance (e.g., a topic variance that represents an emerging topic within survey responses) and provides a variety of functionalities to a digital survey system based on the identified response variance. For example, in one or more embodiments, the topic tracking system receives a first set of digital survey responses corresponding to a first time period and a second set of digital survey responses corresponding to a second time period. In some embodiments, the topic tracking system analyzes the first set of digital survey responses to generate a first response model and analyzes the second set of digital survey responses to generate a second response model. The topic tracking system can analyze the first response model and the second response model to identify a topic variance. In one or more embodiments, the topic tracking system then modifies a digital survey reporting structure based on the topic variance. Additionally, in some embodiments, the topic tracking system generates notifications to notify the survey administrator (as well as other users) of the topic variance. By analyzing digital survey responses to identify a response variance (e.g., topic variance) and providing a variety of functionalities based on the topic variance to survey administrators, the disclosed systems can identify a wide variety of significant information and enable survey administrators to utilize the large amounts of survey response data with increased efficiency and accuracy.

For instance, in some embodiments, the topic tracking system receives a first set of digital survey responses corresponding to a first time period and a second set of digital survey responses corresponding to a second time period. For example, the topic tracking system receives digital survey responses to one or more digital surveys from respondents from various respondent devices during a first time period. In addition, the topic tracking system can also receive digital survey responses to one or more digital surveys (that are similar and/or different from the first time period) from various respondent devices during a second time period.

Furthermore, in one or more embodiments, the topic tracking system analyzes each set of digital survey responses to generate a response model for each set of digital survey responses. For example, in one or more embodiments, the topic tracking system can generate a first response model by identifying response attributes for each digital survey response from the first set of digital survey responses associated with the first time period. In some embodiments, the topic tracking system can identify response attributes such as, but not limited to, sentiment values and/or topic labels associated with each digital survey response. Additionally, in one or more embodiments, the topic tracking system can generate the first response model by generating a set of clusters that represent relations between words associated with the first set of survey responses. Similarly, the topic tracking system can generate a second response model for the second set of digital survey responses by identifying response attributes for each digital survey response from the second set of digital survey responses and/or by generating a set of clusters that represent relations between words associated with the second set of survey responses from the second time period.

After generating the response models, in some embodiments, the topic tracking system analyzes the first response model and the second response model to identify a topic variance. For example, in one or more embodiments, the topic tracking system performs statistical analyses between the response attributes corresponding to the first response model and response attributes corresponding to the second response model to identify a topic variance. Indeed, in some embodiments, the topic variance includes information such as, but not limited to, changes in trends (e.g., popularity) and/or changes in sentiment values associated with topics represented in the digital survey responses. Furthermore, in one or more embodiments, the topic tracking system compares the set of clusters corresponding to the first response model to the set of clusters corresponding to the second response model (i.e., diffing the response models) to identify topic variances such as, but not limited to, an emerging topic (e.g., a new topic that is in the second time period but not in the first time period), a submerging topic (e.g., a topic that was in responses in the first time period but not in responses in the second time period), and/or changes in trends and/or sentiment values associated with the topics represented in the digital survey responses.

Additionally, in one or more embodiments, the topic tracking system modifies a digital survey reporting structure based on the topic variance. For instance, in one or more embodiments, the topic tracking system causes the digital survey system (either automatically or through commands from survey administrators) to initiate tracking of the topic variance (e.g., causing an emerging topic to be tracked within a digital survey system). Moreover, in some embodiments, the topic tracking system causes the digital survey system to initiate actions such as, but not limited to, disabling the tracking of the topic variance and/or generating reports for the topic variance within the digital survey system. In addition to modifying the digital survey reporting structure based on the topic variance, the topic tracking system can also cause the digital survey system to surface (or generate) notifications associated with the topic variance and/or provide the notifications to one or more survey administrators via devices and/or user interfaces (e.g., alerting a shop owner that a new topic, such as cleanliness, has become significant in feedback provided by customers).

By analyzing digital survey responses to generate response models and identify a topic variance between time periods (e.g., an emerging topic, a change in trend corresponding to a topic, and/or a change in sentiment value corresponding to a topic), the topic tracking system can identify a wider variety of significant information from large amounts of survey responses gathered from survey audiences compared to some conventional systems. Specifically, the topic tracking system can identify more significant information (e.g., issues, trends, emerging topics, and/or changes in attitude/sentiment toward topics) from gathered survey responses compared to conventional systems. Indeed, by utilizing the generated response models to identify such information with efficiency and accuracy the topic tracking system can provide significant information to a survey administrator quickly and while such significant information from the survey responses is still of practical importance to an administrator. Consequently, the topic tracking system enables survey administrators to react to such significant information from the survey responses more promptly because the topic tracking system can identify such significant information (e.g., a relevant and accurate emerging topic) from large amounts of survey responses at (or near) the time of occurrence.

Moreover, by analyzing digital survey responses to generate response models and identify a topic variance between time periods, the topic tracking system more efficiently utilizes computational resources. For example, with conventional systems, a survey administrator typically would run a large number of reports in attempts to try and identify trends. Significant processing and bandwidth resources are consumed within conventional systems each time a new report is run. In contrast, the topic tracking system disclosed herein automatically recognizes trends in topics within a large number of survey responses without the need to run multiple reports. Instead of consuming large amounts of processing and communication bandwidth resources to send multiple report (as with conventional systems), the topic tracking system can simply provide a single notification to a survey administer, which efficiently allows the survey administrator to control the tracking of a previously tracked topic or new topic within survey responses.

Furthermore, by providing a variety of functionalities based on the topic variance to survey administrators and/or by providing notifications to survey administrators based on the topic variance, the topic tracking system provides a more efficient and flexible digital survey tool for survey administrators. Specifically, by identifying such topic variances and modifying the digital survey reporting structure based on topic variances, a survey administrator can track and react to a wider variety of information from survey responses that is relevant to the survey administrator's institution and/or audience (e.g., customers). Additionally, by modifying the digital survey reporting structure based on identified topic variances (e.g., creating options to track emerging topics, options to contact a person to address a change in sentiment with a topic, and/or options to communicate with survey respondents to address changes in a topic) the topic tracking system also provides an improved user interface to survey administrators that enables the administrators to identify the information associated with identified topic variances from survey responses with fewer steps (or actions) and/or initiate functions associated with the identified topic variances with fewer steps (or actions).

This disclosure discusses the topic tracking system using multiple terms. A definition of various terms used throughout this disclosure are provided for ease of reference. For instance, as used herein, the term "digital survey" refers to a digital communication that collects information concerning one or more respondents by capturing information from (or posing questions to) such respondents. For example, "digital survey" can refer to a set of digital survey questions or content intended for distribution over a network (e.g., network 120) by way of client devices and further intended to collect responses to the digital survey questions for generating survey results from the collected responses. A digital survey can include one or more digital survey questions and corresponding answer choices that accompany the given question. Accordingly, a digital survey may include digital survey content (e.g., elements that form a digital survey such as, but not limited to, digital survey questions, survey question formats, transmission formats, or information about a respondent).

Furthermore, as used herein, the term "response" (or "digital survey response" or "survey response") refers to an input or selection provided by a respondent device corresponding to a digital question in a digital survey. Depending on the digital question type, the digital survey response may include, but is not limited to, a text input, a selection, an indication of an answer, an actual answer, and/or an attachment. For instance, a response can also include a text response (e.g., text input received from a respondent device). In particular, a text response includes text input provided by a respondent device in response to a digital question. For example, a text response can comprise text such as "I like comedy, action, and horror" received from a respondent device in response to the digital question "what are your favorite movie genres?" In addition, a response can include input from a respondent device in other formats such as, but not limited to, voice input, video input, and/or image input.

Additionally, as used herein, the term "response model" (or "model") refers to an evaluated representation of a plurality responses. In particular, the term "response model" refers to a representation of categories, definitions, and/or relations between a plurality of responses. For instance, a "response model" can include a representation of one or more response attributes corresponding to one or more responses. As used herein, the term "response attribute" (or "attribute") refers to characteristics of a survey response. For instance, a "response attribute" can include characteristics such as, but not limited to, sentiment labels, sentiment values, and/or topic labels associated with a survey response. In addition, a response attribute can include any variety of characteristics based on (or extracted from) a natural language analysis of text (e.g., characteristics such as extracted entities and/or extracted subjects).

Moreover, a "response model" can include a representation of one or more clusters associated with one or more responses. As used herein, the term "cluster" refers to a grouping represented by a relationship between content corresponding to one or more responses. Specifically, the term "cluster" refers to a grouping represented by a relationship between one or more words corresponding to one or more responses. For instance, a "cluster" can include a representation of topics, themes, and/or other categorizations that are recognized from the relationships represented in the contents of one or more responses (e.g., from the words corresponding to the one or more responses).

Moreover, as used herein, the term "response variance" or "topic variance" refers to changes in information related to any combination of one or more responses. In particular, the term "topic variance" refers to changes in the information available from the one or more responses, changes in trends corresponding to the one or more responses, and/or changes in sentiments corresponding to the one or more responses. For example, a topic variance can include an emerging topic (e.g., a new topic), a submerging topic (e.g., the disappearing of a topic), a change in trend for a topic, and/or a change in sentiment value for a topic. Furthermore, the term "topic" refers to a subject represented by a relationship between one or more responses. In particular, a topic refers to a category and/or subject that is represented in the content of a response. For instance, a topic can include various categories and/or subjects associated with aspects of a response such as, but not limited to, products, price, quality, service, interactions, shipping, support, etc.

Furthermore, as used herein, the term "digital survey reporting structure" refers to one or more components that receive, store, analyze, and/or utilize digital surveys and/or digital survey responses. In particular, the term "digital survey reporting structure" refers to one or more tools, implementations, applications, and/or computing devices utilized to administer one or more digital surveys, receive one or more digital survey responses, analyze one or more digital survey responses, and/or track information related to the one or more digital surveys. For instance, the digital survey reporting structure can include a digital survey reporting application that enables a survey administrator to track and/or view reports corresponding to one or more digital survey responses and/or one or more topic variances associated with the one or more digital survey responses.

Additionally, as used herein, the term "notification" refers to information that can be provided to one or more persons and/or devices. In particular, the term "notification" refers to information that can be provided to one or more persons and/or devices to inform the one or more persons and/or devices of information associated with one or more survey responses and/or topic variances associated with the one or more survey responses. For instance, a notification can include, but is not limited to, an alert, a message (e.g., text, email, and/or instant message), a voice message (e.g., a phone call and/or voicemail), a popup window, text and/or indicators on a user interface corresponding to a digital survey system and/or digital survey reporting structure.

Turning now to the figures, FIG. 1 provides an overview of an environment 100 in which a topic tracking system 106 (and/or digital survey system 104) can operate. After providing an overview of the environment 100, this disclosure describes embodiments of the topic tracking system 106 in more detail with reference to FIGS. 2-10.

As illustrated in FIG. 1, the environment 100 includes server device(s) 102. Furthermore, as shown in FIG. 1, the server device(s) 102 include the digital survey system 104 and the topic tracking system 106. Moreover, the environment 100 includes an administrator device 110 associated with a survey administrator 108. As shown in FIG. 1, the administrator device 110 includes an administrator device application 112. The environment 100 further includes respondent devices 114a-114n (collectively referred to as "respondent devices 114") that are respectively associated with survey respondents 118a-118n (collectively referred to as "survey respondents 118"). Each of the respondent devices 114a-114n also respectively include a respondent device application 116a-116n (collectively referred to as the "respondent device applications 116"). In general, the administrator device 110 and the respondent devices 114 communicate with the server device(s) 102, including the digital survey system 104 and the topic tracking system 106, over a network 120.

The survey respondents 118 may use the respondent device applications 116 to respond to digital surveys (i.e., provide digital survey responses). In some embodiments, the respondent device applications 116 include web browsers, applets, dedicated applications (e.g., dedicated digital survey applications), instant message applications, SMS applications, email applications, and/or other software applications available to the respondent devices 114. As used herein, the term "respondent" refers to any person that provides a response to a digital survey. For example, a respondent includes a person that receives a digital survey and can provide a response to the digital survey. For example, a respondent can include consumers, employees, students, and/or other groups of people.

Additionally, the digital survey system 104 provides tools to the administrator device 110 for the survey administrator 108 to compose one or more digital surveys, configure topic tracking settings, view and/or interact with digital survey results and/or reports, and/or configure other digital survey communication settings for the digital survey system 104 via the administrator device applications 112. In some embodiments, the administrator device applications 112 include web browsers, applets, dedicated applications (e.g., dedicated digital survey applications and/or digital survey reporting applications for the digital survey reporting structure), instant message applications, SMS applications, email applications, and/or other software applications available to the administrator device 110. For instance, server device(s) 102 provide one or more administrator device applications 112 (e.g., webpages, user interfaces, and/or applications) to the administrator device 110 to allow the survey administrator 108 to compose the content of digital surveys. Furthermore, the administrator device applications 112 include tools and options that facilitate composing a digital survey for distribution to the respondent devices 114, reviewing survey results (e.g., digital survey reports), facilitate the configuration and/or creation of tracking various information associated with digital surveys and/or survey responses (e.g., tracking topics from one or more survey responses), and/or composing preferences for digital survey communication settings (e.g., preferences for how a digital survey should be conducted, formatted, distributed, etc. and/or how information associated with the survey responses should be reported, tracked, presented, etc.).

The administrator device 110 and the respondent devices 114 can include any one of various types of client devices. For example, the administrator device 110 and the respondent devices 114 can be mobile devices, tablets, laptop computers, desktop computers, smart televisions, televisions, monitors, smart home devices, digital kiosks, or any other type of computing device, as further explained below with reference to FIGS. 12-13. Additionally, the server device(s) 102 can include one or more computing devices, including those explained below with reference to FIGS. 12-13. The administrator device 110, the respondent devices 114, server device(s) 102, and network 120 may communicate using any communication platforms and technologies suitable for transporting data and/or communication signals, including any known communication technologies, devices, media, and protocols supportive of data communications, examples of which are described with reference to FIGS.

12-13. Although, FIG. 1 illustrates a singular administrator device 110, the environment 100 can include any number of administrator devices and/or survey administrators.

As described below, the server device(s) 102 enable various functions, features, processes, methods, and systems described herein using, for example, the digital survey system 104 and/or the topic tracking system 106. Additionally or alternatively, the server device(s) 102 coordinate with the administrator device 110 and/or the respondent devices 114 to perform or provide the various functions, features, processes, methods, and systems described in more detail below. Although FIG. 1 illustrates a particular arrangement of the server device(s) 102, the administrator device 110, the respondent devices 114, and the network 120, additional arrangements are possible. For example, the server device(s) 102, the digital survey system 104 and/or the topic tracking system 106 may directly communicate with the administrator device 110 and thus bypass the network 120.

In certain embodiments, the digital survey system 104 receives (and stores) survey responses from the respondent devices 114 or the administrator device 110 through network 120 in response to one or more digital surveys provided by the administrator device 110. Furthermore, the topic tracking system 106 analyzes the survey responses in one or more sets (e.g., based on time periods and/or other groupings) to generate one or more response models in accordance with the embodiments below. Furthermore, the topic tracking system 106 analyzes the one or more response models to identify one or more topic variances associated with the survey responses from the respondent devices 114 in accordance with the embodiments below. Based on the topic variance, the topic tracking system 106 can modify the digital survey reporting structure (on the server device(s) 102 and/or the administrator device applications 112 on the administrator device 110) associated with the one or more digital surveys. In some embodiments, the digital survey system 104 (and/or the topic tracking system 106) can generate and/or provide a notification associated with the identified one or more topic variances to the administrator device 110.

Figure 2:
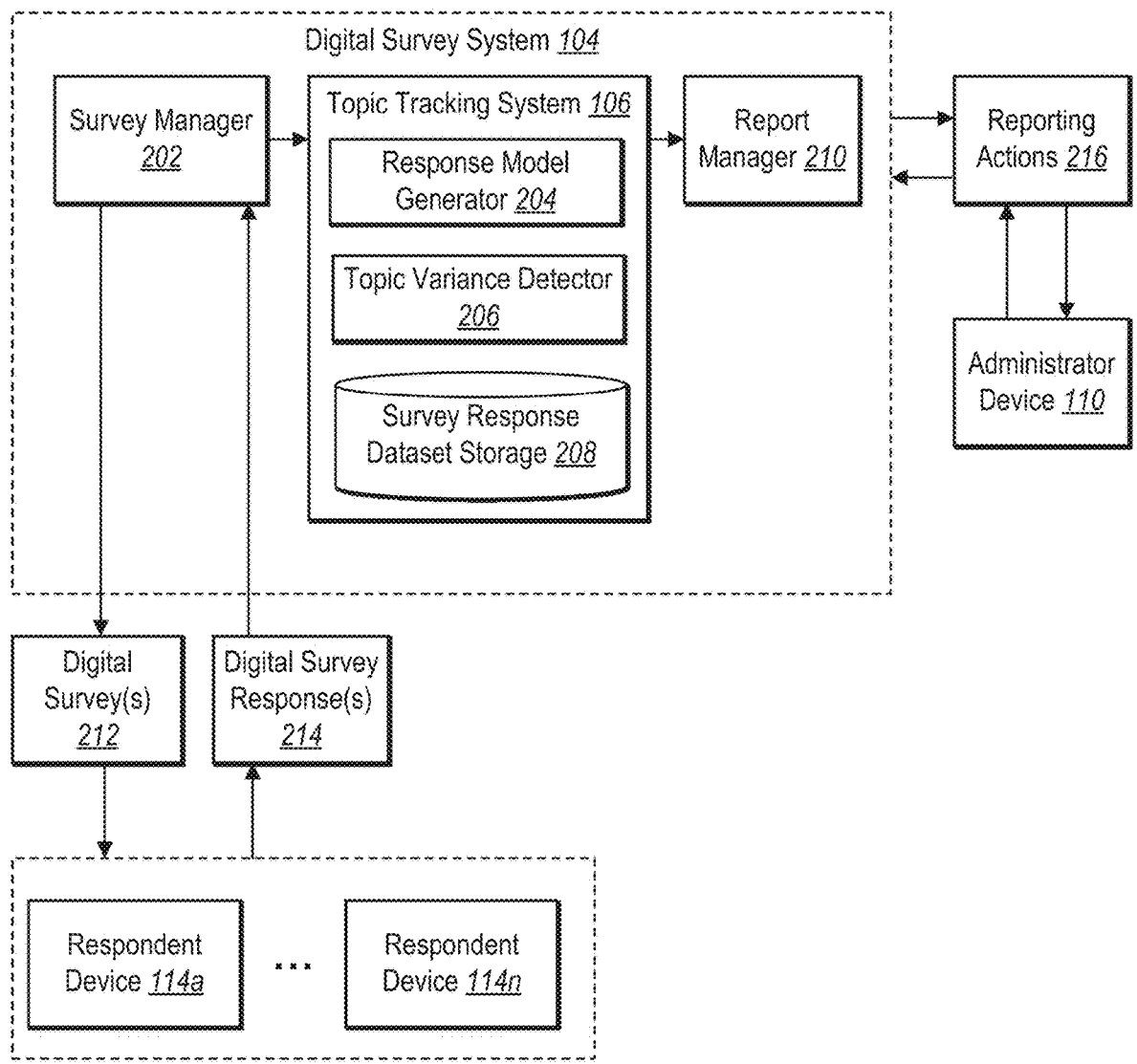
FIG. 2 illustrates an example environment in which a topic tracking system identifies a topic variance and modifies a digital survey reporting structure in accordance with one or more embodiments.

Turning now to FIG. 2, these figures provide an overview of embodiments of the digital survey system 104 that generate one or more response models from survey responses, identify a topic variance based on the one or more response models, and modify a digital survey reporting structure associated with one or more digital surveys based on the topic variance. Specifically, FIG. 2 illustrates a flow diagram of an overview for generating one or more response models from survey responses, identifying a topic variance based on the one or more response models, and modifying a digital survey reporting structure associated with one or more digital surveys based on the topic variance. For instance, as shown in FIG. 2, the digital survey system can include a survey manager 202, the topic tracking system 106, and a report manager 210. Furthermore, the topic tracking system 106 can include a response model generator 204, a topic variance detector 206, and a survey response dataset storage 208. Moreover, as shown in FIG. 2, the digital survey system 104 can communicate with the respondent devices 114 and the administrator device 110. Although FIG. 2 illustrates the topic tracking system 106 as a component of the digital survey system 104, the description herein can refer to the topic tracking system 106 performing all of the steps for one or more embodiments disclosed herein. Indeed, the one or more embodiments disclosed herein can be performed by the digital survey system 104 and/or the topic tracking system 106 with any described component and/or in any arrangement.

For example, as shown in FIG. 2, the digital survey system 104 can send and/or receive information from the respondent devices 114. As illustrated in FIG. 2, the survey manager 202 of the digital survey system 104 can provide one or more digital surveys 212 to the respondent devices 114. Furthermore, the survey manager 202 can receive digital survey response(s) 214 to the one or more provided digital surveys. In one or more embodiments, the survey manager 202 tracks (or keeps record) of information such as, but not limited to, time stamps for survey responses, the number of survey responses received for each digital survey, a counter that increments with each received survey response, demographic information of respondents corresponding to the survey responses, and/or digital surveys corresponding to the survey responses.

Additionally, in some embodiments, the survey manager 202 provides the survey responses and any information associated with the survey responses to the topic tracking system 106. The topic tracking system 106 can store the survey responses and associated information to the survey response dataset storage 208. In one or more embodiments, the topic tracking system 106 can store the survey responses in the survey responses dataset storage 208 in one or more categorized datasets based on characteristics such as, but not limited to, time, quantity, and/or demographic information associated with the survey responses (as described in detail below).

Furthermore, in one or more embodiments, the topic tracking system 106 utilizes survey response data stored in survey response dataset storage 208 to generate one or more response models and identify a topic variance based on the one or more response models. For instance, as shown in FIG. 2, the topic tracking system 106 can utilize a dataset of survey responses from the survey response dataset storage 208 (e.g., a dataset corresponding to a first time period) and generate a response model corresponding to the dataset (e.g., a response model that includes response attributes and/or clusters) by utilizing the response model generator 204. Moreover, the topic tracking system 106 can utilize another dataset of survey responses from the survey response dataset storage 208 (e.g., a dataset corresponding to a second time period) and generate a response model corresponding to the other dataset by utilizing the response model generator 204. Indeed, the topic tracking system 106 can generate a response model for any number of survey response datasets. The generation of response models is discussed in detail below with reference to FIGS. 3-5.

Upon generating the one or more response models, the topic tracking system 106 can analyze the one or more response models to identify a topic variance. For instance, as shown in FIG. 2, the topic tracking system 106 can utilize the topic variance detector 206 to analyze the one or more response models from the response model generator 204 to identify one or more topic variances (e.g., an emerging topic, a change in trend for a topic, and/or a change in sentiment value for a topic). For example, the topic tracking system 106 can analyze the one or more response models to identify the one or more topic variances by performing a statistical analysis of response attributes and/or an analysis of clusters corresponding to the one or more response models. The analysis of response models by the topic tracking system 106 to identify a topic variance is described in further detail in FIGS. 3-5.

Additionally, in one or more embodiments, the topic tracking system 106 utilizes the one or more identified topic variances to modify the structure of the digital survey reporting system. For instance, after identifying one or more topic variances, the topic tracking system 106 interacts with the report manager 210 (of the digital survey system 104) to modify the structure of the digital survey reporting system based on the one or more topic variances and/or generate notifications associated with the one or more topic variances. In particular, the topic tracking system 106 can interact with the report manager 210 to modify the digital survey reporting structure by causing the report manager 210 to change and/or create tracking activities associated with the topics associated with the survey responses, change and/or create reports based on the one or more topics associated with the survey responses, and/or other actions (as described in further detail in FIGS. 6-10). In addition or alternatively, the topic tracking system 106 can generate (or cause the reporting manager 210 to generate) a notification associated with the one or more topic variances as described in further detail in FIGS. 6-10.

Furthermore, the report manager 210 (or the digital survey system 104) can communicate (and/or interact) with the administrator device 110 to send and/or receive reporting actions 216. For instance, the administrator device 110 can interact with the digital survey system 104 to view, configure, receive, and/or request a variety of reports, tracking options, and/or digital survey options. In particular, in some embodiments, the digital survey system 104 (or topic tracking system 106) provides one or more selectable options and/or reports that are based on an identified topic variance to the administrator device 110 (as described in further detail in FIGS. 6-10). Additionally, in one or more embodiments, the digital survey system 104 (or topic tracking system 106) provides one or more notifications associated with the identified topic variance to the administrator device 110 (as described in further detail in FIGS. 6-10).

Figure 3:
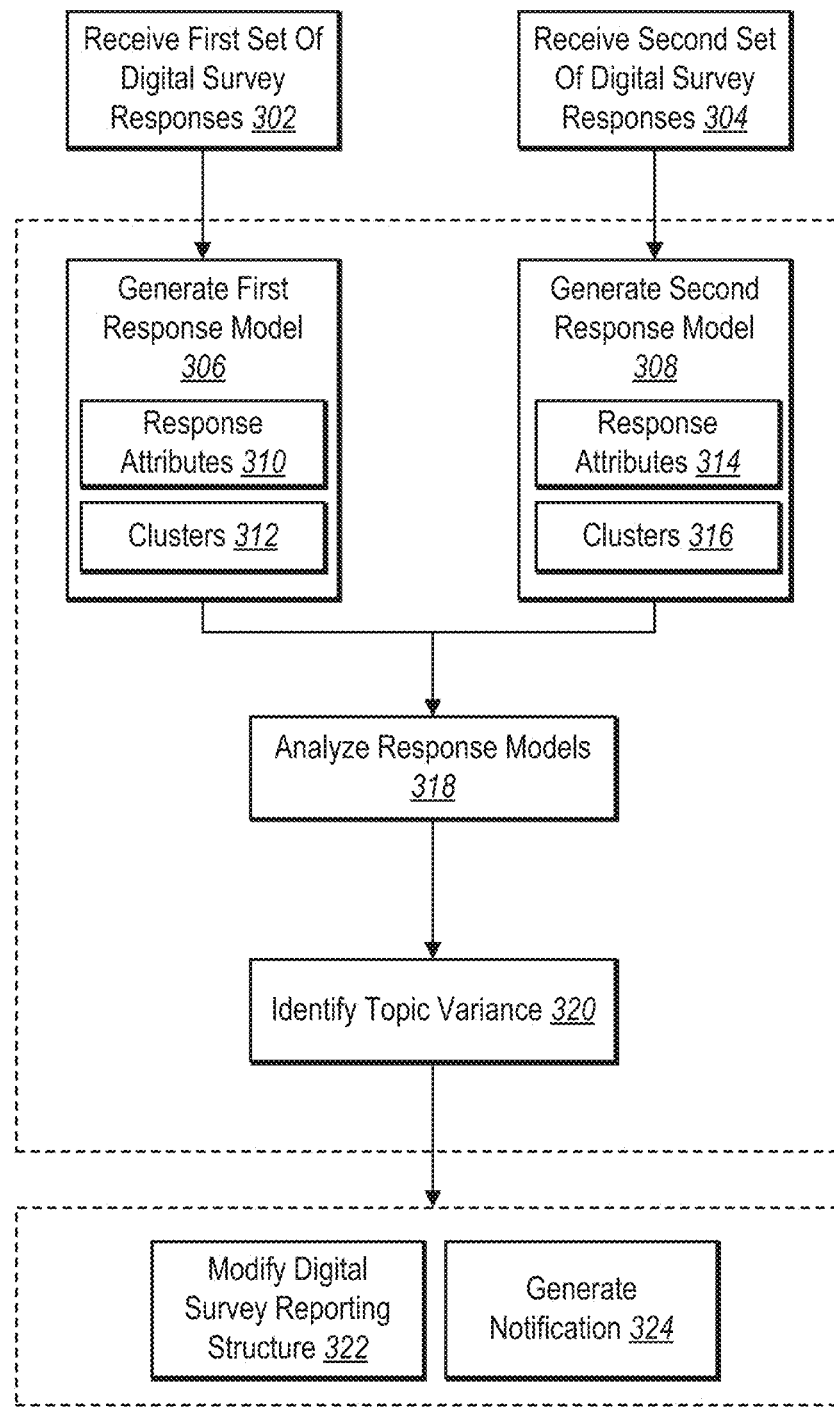
FIG. 3 illustrates a flow diagram of a topic tracking system generating response models and identifying a topic variance to modify a digital survey reporting structure in accordance with one or more embodiments.

As mentioned above, the topic tracking system 106 can generate one or more response models from survey responses and identify one or more topic variances based on the one or more response models. For instance, FIG. 3 illustrates an overview of the topic tracking system 106 generating response models and identifying a topic variance based on the response models from two sets of digital survey responses. In particular, FIG. 3 illustrates the topic tracking system 106 receiving a first set of digital survey responses in act 302 to generate a first response model in act 306 and receiving a second set of digital survey responses in act 304 to generate a second response model in act 308. Furthermore, FIG. 3 illustrates the topic tracking system 106 analyzing the first and second response models in act 318 to identify a topic variance in act 320. Additionally, FIG. 3 also illustrates the topic tracking system 106 utilizing the identified topic variance from act 320 to modify a digital survey reporting structure in act 322 and/or generating a notification (associated with the topic variance) in act 324.

As shown in FIG. 3, the topic tracking system 106 receives the first set of digital survey responses in act 302 and the second set of digital survey responses in act 304. In one or more embodiments, the topic tracking system 106 receives digital survey responses from one or more survey respondents. Alternatively or in addition, in some embodiments, the topic tracking system 106 receives one or more survey responses that are stored on the digital survey system 104. In addition, the topic tracking system 106 can store and/or utilize any number of survey responses in each set of survey responses. Moreover, the digital survey responses corresponding to each set may be responses from the same, different, or any combination of the same and different survey respondents. Although FIG. 3 illustrates the topic tracking system 106 utilizing two sets of digital survey responses, the topic tracking system 106 can utilize any number of sets of digital survey responses that are categorized based on criteria and/or configurations described in further detail below (e.g., time periods, types of digital surveys, or a threshold number of responses).

Additionally, the topic tracking system 106 can receive digital survey responses in response to one or more digital surveys. For instance, the digital survey responses corresponding to each set may be digital survey responses in response to the same, different, or any combination of the same and different digital surveys. For example, the topic tracking system 106 can utilize sets of digital survey responses that include digital survey responses to the same set of digital surveys. In some embodiments, the topic tracking system 106 utilizes sets of digital survey responses that include digital survey responses to a set of digital surveys that generally present the same survey content (or questions) in a different format and/or phrasing for one or more questions. Moreover, in some embodiments, the topic tracking system 106 utilizes sets of digital survey responses that include digital survey responses to a set of digital surveys that include different survey content (or questions).

Moreover, the topic tracking system 106 can receive various types of digital survey responses. In particular, the topic tracking system 106 can receive digital survey responses in various formats. For example, in one or more embodiments, the topic tracking system 106 receives free-text responses as the digital survey responses (e.g., responses that are composed by survey respondents in response to one or more digital survey prompts and/or questions). For instance, a free-text response can include a text response of any size to a digital survey question (e.g., a character limited response, a one page response, a non-limited response, etc.). Furthermore, in some embodiments, the free-text response includes a typed comment (or feedback) in response to a prompt that requests a comment (or feedback).

In some embodiments, the topic tracking system 106 receives digital survey responses in a variety of languages. Indeed, the topic tracking system 106 can utilize digital survey responses corresponding to different languages within the same sets of digital survey responses (e.g., by translating to a similar language or by performing a language agnostic analysis). Furthermore, in some embodiments, the topic tracking system 106 receives digital survey responses (for generating response models and identifying topic variances) in other various formats such as, but not limited to, voice and video based responses.

In one or more embodiments, the topic tracking system 106 can receive (or request) the first set of digital survey responses in act 302 and the second set of digital survey responses in act 304 in a configured grouping. For instance, in one or more embodiments, the topic tracking system 106 receives sets of digital survey responses that are grouped by time periods. In particular, the topic tracking system 106 can receive a set of digital survey responses in which the digital survey responses correspond to responses received during a specified time period (e.g., a time range). Indeed, the specified time period can include any amount of time (e.g., an hour, a day, a week, a month, a year, or longer time period).

As an example, the topic tracking system 106 can receive the first set of digital survey responses in act 302 in which the digital survey responses correspond to a first time period and can receive the second set of digital survey responses in act 304 in which the digital survey responses correspond to a second time period. For example, the second time period, corresponding to the digital survey responses of the second set of digital survey responses in act 304, can be the last thirty days and, thus, the second set of digital survey responses can include digital survey responses received by the digital survey system 104 (or the topic tracking system 106) within the last thirty days. In addition, the first time period, corresponding to the digital survey responses of the first set of digital survey responses in act 302, can be the time before the last thirty days and, as a result, the first set of digital survey responses can include digital survey responses received by the digital survey system 104 prior to the last thirty days. In some embodiments, the topic tracking system 106 can adjust the time periods based on the volume of digital survey responses (e.g., decrease the amount of time per time period when there is a high volume of digital survey responses and/or increase the amount of time per time period when there is a low volume of digital survey responses).

In one or more embodiments, the topic tracking system 106 can receive (or request) sets of digital survey responses in other types of groupings (or categorizations). For instance, in one or more embodiments, the topic tracking system 106 receives sets of digital survey responses that correspond to an amount of digital survey responses. In particular, the topic tracking system 106 can receive a set of digital survey responses that includes a threshold number of digital survey responses. Indeed, each set of digital survey responses can correspond to the last threshold number (e.g., any configured number) of digital survey responses received.

For instance, the topic tracking system 106 can receive (or request) the first set of digital survey responses in act 302 upon collecting a first threshold number of digital survey responses (e.g., a thousand responses). Furthermore, the topic tracking system 106 can receive (or request) the second set of digital survey responses in act 304 upon collecting a second threshold number of digital survey responses (e.g., the subsequent thousand responses). In one or more embodiments, the threshold amount (or number) per set of digital responses can be the same or different (e.g., a thousand responses for the first set of digital survey responses and a hundred responses for the second set of digital survey responses).

Furthermore, in one or more embodiments, the topic tracking system 106 can receive (or request) the first set of digital survey responses in act 302 and the second set of digital survey responses in act 304 based on filters (or characteristics). In particular, the sets of digital survey responses can include digital survey responses based on filters (or characteristics) such as, but not limited to, regions, demographics, and/or other characteristics assigned to and/or corresponding to the one or more digital survey responses received from survey respondents. Moreover, in some embodiments, the sets of digital survey responses can include digital survey responses based on such filters that are assigned to and/or corresponding to survey respondents associated with the digital survey responses. For example, the topic tracking system 106 can receive a set of digital survey responses that are based on filters such as, but not limited to, the survey responses originating from a specific region, the survey responses originating from survey respondents of a specific age group, or the survey responses are in response to a digital survey corresponding to a specific department within an organization (e.g., technical support). Furthermore, the filters can also include information corresponding to areas of organizations, products, customer groups, roles, and/or customer types.

Indeed, the topic tracking system 106 can utilize various filters (such as the filters described above) to create sets of digital survey responses, to analyze digital survey responses, to generate a response model, to identify a topic variance, modify the digital survey reporting structure based on a topic variance, and/or generate (and/or distribute) notifications based on a topic variance. In addition, the topic tracking system 106 can utilize any combination of filters. In particular, the topic tracking system 106 can receive filter information (and/or other configuration preferences) to create sets of digital survey responses, to analyze digital survey responses, to generate a response model, to identify a topic variance, modify the digital survey reporting structure based on a topic variance, and/or generate (and/or distribute) notifications based on a topic variance from the administrator device 110.

In one or more embodiments, the topic tracking system 106 can receive filter information and/or other configuration preferences (e.g., time periods, thresholds for the number of digital survey responses, and/or notification distribution settings) from the administrator device 110 through a digital survey system 104 (e.g., a user interface for the digital survey system 104). For example, the administrator device 110 can provide filter information and/or other configuration preferences when the administrator device 110 is initializing the tracking of one or more digital surveys. Furthermore, the topic tracking system 106 can receive filters and/or other configuration preferences in response to the administrator device 110 assigning other actions of the topic tracking system 106 (e.g., assigning where to distribute notifications based on a topic variance, determining how to generate reports based on a topic variance, etc.).

Moreover, the topic tracking system 106 can generate (and/or utilize) a training set of digital survey responses to test and/or optimize the topic tracking system 106. For example, the topic tracking system 106 can utilize a training set of digital survey responses that include tagged topics and/or other response attributes. In particular, the training set of digital survey responses may include digital survey responses that are gathered (or generated) by the topic tracking system 106 and labelled to include tagged topics and/or other attributes. Indeed, the topic tracking system 106 can generate response models and/or identify topic variances for the training set of digital survey responses to optimize and/or test the accuracy of the topic tracking system 106 (e.g., the accuracy of response models and/or identified topic variances). In one or more embodiments, the topic tracking system 106 utilizes a training set of digital survey responses with a varying difficulty (e.g., a dataset of digital survey responses with complex responses and/or simpler responses).

Furthermore, the topic tracking system 106 can generate response models and identify a topic variance from survey responses, upon receiving the sets of digital survey responses. In particular, in one or more embodiments, the topic tracking system 106 automatically initiates generating one or more response models and identifying a topic variance based on the one or more response models upon receiving one or more sets of digital survey responses in accordance with any of or any combination of groupings and/or filters described above (e.g., when two sets of digital survey responses fulfill the time period associated with each set of digital survey responses). In some embodiments, the topic tracking system 106 initiates generating the one or more response models and identifying the topic variance upon command from the administrator device 110. Indeed, the topic tracking system 106 can receive a command from the administrator device 110 to generate one or more response models and identify a topic variance for sets of digital survey responses selected (or provided) by the administrator device 110. In some embodiments, the topic tracking system 106 analyzes the digital survey responses (from the sets of digital survey responses) to identify and/or resolve spelling errors and/or other errors prior to generating the one or more response models.

As shown in FIG. 3, the topic tracking system 106 can generate the first response model in act 306 from the first set of digital survey responses received in act 302. Indeed, as shown in FIG. 3, the topic tracking system 106 can generate the first response model in act 306 by identifying response attributes 310 and/or generating clusters 312 from the first set of digital survey responses received in act 302. Moreover, as illustrated in FIG. 3, the topic tracking system 106 can generate the second response model in act 308 by identifying response attributes 314 and/or generating clusters 316 from the second set of digital survey responses received in act 304. Furthermore, as shown in FIG. 3, the topic tracking system 106 can analyze the response models (e.g., the first and second response models from acts 306 and 308 respectively) in act 318 to identify a topic variance in act 320. For instance, the topic tracking system 106 can utilize response models that include any of or any combination of response attributes and/or clusters.

As mentioned above, the topic tracking system 106 can identify response attributes from survey responses and perform statistical analyses between response attributes corresponding to the response models (or the sets of digital survey responses) to identify a topic variance. Indeed, the topic tracking system 106 generating a response model by identifying response attributes from digital survey responses and identifying a topic variance based on the response attributes is described in further detail in FIGS. 4A and 4B. Additionally, the topic tracking system 106 can also generate response models by generating clusters for sets of digital survey responses and identifying a topic variance based on an analysis of the clusters as described in further detail in FIGS. 5A and 5B.

As illustrated in FIG. 3, upon identifying a topic variance in act 320, the topic tracking system 106 can modify the digital survey reporting structure (based on the topic variance) in act 322 and/or generate (or provide) a notification in act 324 that is associated with the topic variance. Indeed, the topic tracking system 106 modifying the digital survey reporting structure based on the topic variance is described in further detail in FIGS. 6-10. Moreover, the topic tracking system 106 generating the notification associated with the topic variance is described in further detail in FIGS. 6-10.

Figure 4A:
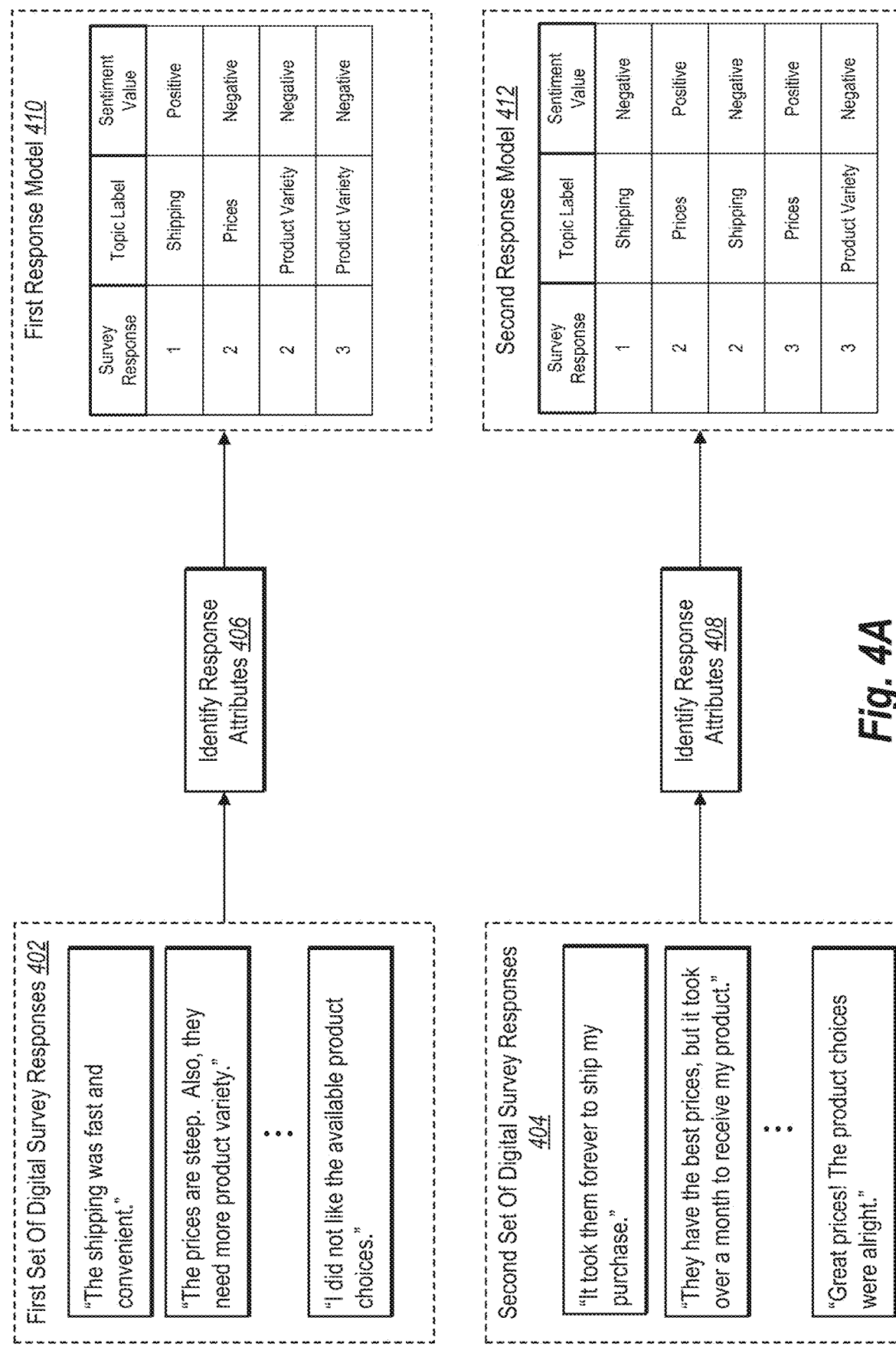
FIG. 4A illustrates a topic tracking system generating response models that include response attributes from sets of digital survey responses in accordance with one or more embodiments.

As mentioned above, the topic tracking system 106 can analyze digital survey responses to identify response attributes associated from the digital survey responses to generate a response model. For instance, FIG. 4A illustrates the topic tracking system 106 generating a response model by identifying response attributes from digital survey responses. In particular, FIG. 4A illustrates that the topic tracking system 106 analyzes the digital survey responses from a first set of digital survey responses 402 and the digital survey responses from a second set of digital survey responses 404 to identify response attributes in acts 406 and 408 to generate the first response model 410 and the second response model 412 (respectively). Indeed, as shown in FIG. 4A, the first response model 410 and the second response model 412 each include response attributes (e.g., topic labels and sentiment value) identified from the first set of digital survey responses 402 and the second set of digital survey responses 404 by the topic tracking system 106.

In one or more embodiments, the topic tracking system 106 identifies various types of response attributes from digital survey responses. For instance, the topic tracking system 106 can identify response attributes such as sentiment values associated with digital survey responses, sentiment values associated with topic labels of digital survey responses, and/or topic labels associated to the digital survey responses. Indeed, the topic tracking system 106 can identify any of, or any combination of, various response attributes by analyzing the text corresponding to the one or more digital survey responses.

For instance, in one or more embodiments, the topic tracking system 106 identifies sentiment values from the digital survey responses as a response attribute. In particular, the topic tracking system 106 can analyze the text corresponding to each digital survey by utilizing a sentiment analysis (e.g., an emotion analysis) to identify one or more sentiments (or emotions) associated with the text of a digital survey response. Indeed, in one or more embodiments, the topic tracking system 106 can identify a sentiment (or emotion) associated with the survey response, a sentiment score associated with the survey response, and/or a polarity associated with the survey response as parts of the sentiment value. Furthermore, the topic tracking system 106 can identify a sentiment value for each topic associated with a digital survey response. Additionally, the topic tracking system 106 can associate more than one sentiment value per digital survey response.

In some embodiments, the topic tracking system 106 identifies a sentiment associated with text in a survey response as a sentiment score. For instance, in one or more embodiments, the topic tracking system 106 analyzes the text of a survey response to determine a sentiment score between negative ten and positive ten. Indeed, a sentiment score of negative ten can represent the most negative sentiment and a positive ten can represent the most positive sentiment associated with a survey response. For example, the topic tracking system 106 can analyze the survey response "I like ice cream" to identify that the sentence includes a positive sentiment and associate a sentiment score of positive seven to the survey response. Furthermore, the topic tracking system 106 can utilize other scoring and/or labeling methods to score the sentiment value of a survey response. For example, the topic tracking system 106 can utilize a set of labels that correspond to emotions (e.g., happy, sad, angry, etc.).

Furthermore, the topic tracking system 106 can identify a polarity associated with the survey response. In particular, the topic tracking system 106 can analyze the text associated with a survey response to identify whether the survey response may have multiple sentiments to identify the polarity by determining a polarity score. Indeed, the polarity score can be a value between zero and positive ten. For instance, a polarity score of zero can represent that there is no polarity in the sentiments identified within a survey response and a polarity score of positive ten can represent that the sentiments identified within a survey response are highly polarized. For example, the topic tracking system 106 can analyze the survey response "I like your shipping, but I don't like your prices" to identify a polarity score of eight (e.g., highly polarized). Additionally, the topic tracking system 106 can modify (and/or identify) a sentiment score associated with a survey response based on a polarity score. For example, when the survey response "I like your shipping, but I don't like your prices" corresponds to a polarity score of eight, the topic tracking system 106 can identify a sentiment score of zero (e.g., neutral sentiment) for the survey response.

Moreover, the topic tracking system 106 can utilize a plurality of sentiment categories to assign a sentiment value to a digital survey response. For instance, in one or more embodiments, the topic tracking system 106 utilizes a plurality of buckets to assign a sentiment value to a digital survey response. In particular, upon analyzing the text of a digital survey response to identify a sentiment score and/or a polarity score, the topic tracking system 106 can utilize the sentiment score and/or polarity score to associate the digital survey response with a bucket (or sentiment category). In one or more embodiments, the topic tracking system 106 utilizes buckets (or sentiment categories) that represent a positive sentiment, a negative sentiment, a neutral sentiment, and/or a mixed sentiment. For example, the topic tracking system 106 can associate a survey response with a sentiment score of positive eight with the positive sentiment bucket. Also, as an example, the topic tracking system 106 can associate a survey response with a sentiment score of positive three and a polarity score of positive ten in the neutral sentiment bucket.

The topic tracking system 106 can utilize various methods to identify a sentiment value from a digital survey response. For instance, in some embodiments, the topic tracking system 106 utilizes a third party sentiment analysis application to identify a sentiment value from a digital survey response. Furthermore, the topic tracking system 106 can utilize sentiment analysis methods such as, but not limited to, a keyword analysis, a lexicon-based sentiment analysis (also known as knowledge-based sentiment analysis) or statistical-based sentiment analysis.

In addition to determining a sentiment of a response, the topic tracking system 106 can analyze text from a digital survey response to identify a topic label for the digital survey response as a response attribute. For instance, the topic tracking system 106 can analyze the words represented in the text from a digital survey response to identify a topic associated with the digital survey response. In particular, the topic can represent the primary subject and/or theme of the digital survey response. Indeed, the topic tracking system 106 can associate a topic label with a digital survey response after identifying a topic for the digital survey response. In some embodiments, the topic tracking system 106 associates more than one topic label with a digital survey response.

For example, in one or more embodiments, the topic tracking system 106 can utilize a set of known topics to identify a topic associated with the text of a digital survey response. In particular, the topic tracking system 106 can utilize the set of known topics and a set of common words associated with topics from the set of known topics to identify a topic based on the words corresponding to the digital survey response. For instance, the topic tracking system 106 can compare the words, from the digital survey response to the words associated with topics from the set of known topics to select topics for the digital survey response. In one or more embodiments, the topic tracking system 106 ranks the selected topics from the set of known topics based on the words (e.g., some words having a stronger correlation to a topic) and selects the highest ranked topic as the topic label for a digital survey response.

The topic tracking system 106 can utilize various methods to identify topics from digital survey responses. For instance, the topic tracking system 106 can utilizes third party applications for text analysis to identify topics from digital survey responses. Furthermore, the topic tracking system 106 can utilize methods such as, but not limited to, natural language processing, machine learning, and/or latent Dirichlet allocation to identify topics from digital survey responses.

Upon identifying one or more response attributes for one or more digital survey responses, the topic tracking system 106 can generate a response model from the one or more response attributes and digital survey responses. In particular, in one or more embodiments, the topic tracking system 106 can associate one or more identified sentiment values and one or more identified topic labels to each digital survey response from a set of digital survey responses. For instance, topic tracking system 106 can generate a data table that includes each digital survey response and one or more identified sentiment values and/or topic labels corresponding to the digital survey response. In addition to sentiment values and topic labels, the topic tracking system 106 can also identify other response attributes (and/or metrics) such as, but not limited to, demographics and/or purchasing potential.

As an example, FIG. 4A illustrates the topic tracking system 106 identifying sentiment values and topic labels as response attributes for digital survey responses to generate response models. As in FIG. 4A, the topic tracking system 106 can receive the first set of digital survey responses 402 which include text based digital survey responses such as "the shipping was fast and convenient" and "I did not like the available product choices." Furthermore, as illustrated in FIG. 4A, the topic tracking system 106 can also receive the second set of digital survey responses 404 which include text based digital survey responses such as "it took them forever to ship my product" and "they have the best prices, but it took over a month to receive my product."

Furthermore, as shown in FIG. 4A the topic tracking system 106 analyzes the digital survey responses to identify response attributes to generate the response models for each set of digital survey responses. Indeed, as illustrated in FIG. 4A, the topic tracking system 106 identifies a topic label of "shipping" and a sentiment value of "positive" for the first digital survey response from the first set of digital survey responses 402. Furthermore, as shown in FIG. 4A, the topic tracking system 106 identifies a topic label of "prices" and a sentiment value of "negative" for the second digital survey response from the first set of digital survey responses 402. Moreover, as shown in FIG. 4A, the topic tracking system 106 can also identify a topic label of "product variety" and a sentiment value of "negative" for the second digital survey response from the first set of digital survey responses 402 because of the sentence "Also, they need more product variety." Indeed, the topic tracking system 106 can utilize the identified response attributes from the first set of digital survey responses 402 to generate the first response model 410 (which includes the identified response attributes in relation to digital survey responses from the first set of digital survey responses 402).

Additionally, as illustrated in FIG. 4A, the topic tracking system 106 identifies a topic label of "shipping" and a sentiment value of "negative" for the first digital survey response from the second set of digital survey responses 404. Furthermore, as shown in FIG. 4A, the topic tracking system 106 identifies a topic label of "prices" and a sentiment value of "positive" for the second digital survey response from the second set of digital survey responses 404. Moreover, as shown in FIG. 4A, the topic tracking system 106 can also identify a topic label of "shipping" and a sentiment value of "negative" for the second digital survey response from the second set of digital survey responses 402 because the survey response includes "but it took over a month to receive my product."

Indeed, the topic tracking system 106 can utilize the identified response attributes from the second set of digital survey responses 404 to generate the second response model 412 (which includes the identified response attributes in relation to digital survey responses from the second set of digital survey responses 404). The topic tracking system 106 can identify response attributes for any number of digital survey responses and generate a response model based on any number of digital survey responses. Indeed, referring to FIG. 4A, the topic tracking system 106 can identify response attributes for each survey response from the first set of digital survey responses 402 and the second set of digital survey responses 404 to generate the first response model 410 and the second response model 412 (respectively).

Figure 4B:
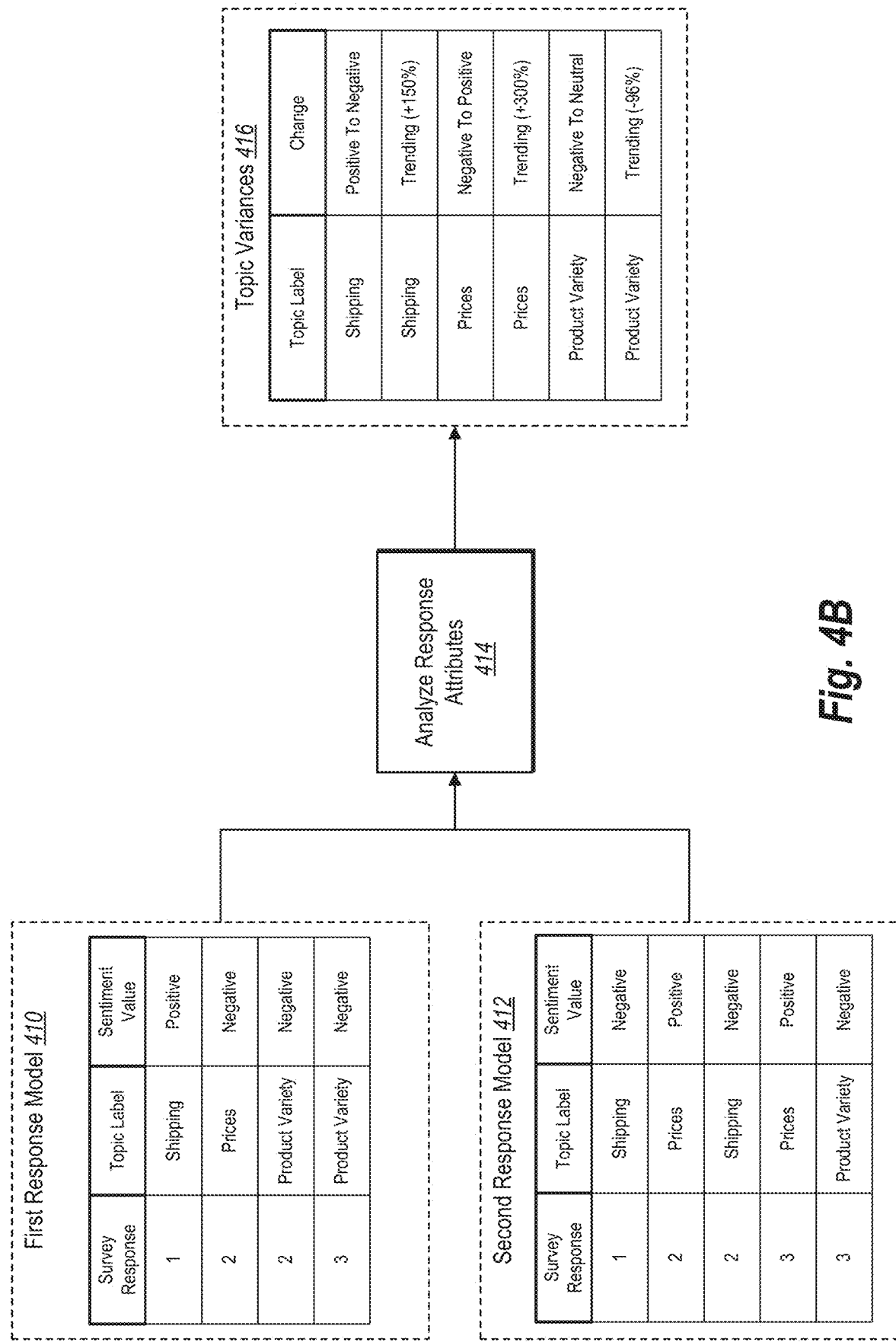
FIG. 4B illustrates a topic tracking system identifying topic variances in accordance with one or more embodiments.

As mentioned above, the topic tracking system 106 can analyze one or more response models that include response attributes to identify a topic variance. For example, FIG. 4B illustrates the topic tracking system 106 analyzing the generated first response model 410 and the second response model 412, both including response attributes identified from survey responses of the first set of digital survey responses 402 and the second set of digital survey responses 404 (respectively) to identify one or more topic variances. For instance, as shown in FIG. 4B, the topic tracking system 106 analyzes the response models in act 414 to identify topic variances 416 (e.g., shown as a data table of topic labels and the associated change). In particular, the topic tracking system 106 can determine the topic variances such as, but not limited to, a change in trend for a topic and/or a change in sentiment value of a topic.

For example, in one or more embodiments, the topic tracking system 106 analyzes one or more response models which include response attributes by performing statistical analyses on the response attributes available in the one or more response models to identify a topic variance. In some embodiments, the topic tracking system 106 performs statistical analyses such as, but not limited to, determining coverage (and/or frequency) of a topic, determining proportional change, performing subtractions, performing a regression analysis, and/or determining averages for sentiment scores. Furthermore, the topic tracking system 106 can perform such statistical analyses on each individual response model (e.g., a response model including multiple digital survey responses with corresponding topic labels and/or sentiment values). Although, some examples are provided herein to illustrate the topic tracking system 106 performing statistical analyses on one or more response models to identify a topic variance, the topic tracking system 106 can perform various analyses to identify topic variances (e.g., changes in other metrics such as, but not limited to, demographics and/or purchasing potential).

For instance, the topic tracking system 106 can perform a statistical analysis with the response models to identify a change in trend for a topic as the topic variance. For example, in one or more embodiments, the topic tracking system 106 tracks a frequency of each topic label to determine a trend. In particular, the topic tracking system 106 can utilize the response models to determine the number of times a topic label is identified (or mentioned) within each response model. Then, the topic tracking system 106 can compare the number of times the topic label is mentioned in one response model to the number of times the same topic label is mentioned in the other response model to determine whether there have been less mentions, more mentions, or a similar amount of mentions for the topic label. For instance, the topic tracking system 106 can determine the amount of change in mentions as a percentage. In some embodiments, the topic tracking system 106 utilizes term frequency-inverse document frequency ("TF-IDF") to determine the topic and/or term frequency from a set of digital survey responses and/or response model. Furthermore, the topic tracking system 106 can also utilize a lookup dictionary of terms (e.g., a lookup dictionary created for words from the digital survey responses) to determine the frequency of topics and/or terms.

As an example, FIG. 4B illustrates the topic tracking system 106 analyzing the response attributes in act 414 from the first response model 410 and the second response model 412 to determine a change in trend for a topic variance. Indeed, as shown in FIG. 4B, the topic tracking system can determine, as a topic variance, that there has been a 150% increase in mentions of the topic of "shipping" in the second response model 412 as a topic variance in the topic variances 416 (e.g., "Trending (+150%)") and/or that there has been a 96% decrease in mentions of the topic of "product variety" in the second response model 412 as a topic variance in the topic variances 416 (e.g., "Trending (−96%)").

Moreover, the topic tracking system 106 can perform a statistical analysis with the response models to identify a change in proportion for a topic as the topic variance. For instance, the topic tracking system 106 can determine a shift in proportions for topics within two or more response models. In particular, the topic tracking system 106 can determine that a topic label is mentioned at a higher ratio to other topic labels (e.g., determining that mentions a topic label grew in mentions or shortened in mentions in comparison to other topic labels between two response models). For instance, the topic tracking system 106 can analyze the response attributes from a first response model and a second response model to determine that the ratio of mentions for the topic of "prices" has increased from 1:1 to 2:1 from the first response model to the second response model as a topic variance.

Furthermore, the topic tracking system 106 can perform a statistical analysis with the response models to identify a change in sentiment value for a topic as the topic variance. For example, the topic tracking system 106 can determine a change in the amount (or proportions) of digital survey responses associated with different types of sentiment values between response models as the topic variance. For example, the topic tracking system 106 can determine that a topic label is mentioned more often with a negative sentiment than a positive sentiment as the change (between two or more response models) as the topic variance. In some embodiments, the topic tracking system 106 determines the average sentiment score for a topic label in each response model and analyzes the change in the average sentiment score to identify a topic variance (e.g., an average sentiment score for a topic label increased, decreased, or remained similar). For example, as shown in FIG. 4B, the topic tracking system 106 analyzes the response attributes in act 414 from the first response model 410 and the second response model 412 to determine that the sentiment value for the topic label of "shipping" has changed from a positive to a negative sentiment as the topic variances in the topic variances 416 (e.g. "Positive to Negative").

Additionally, the topic tracking system 106 can perform statistical analysis with the response models to identify a relationship between a topic and overall satisfaction (or sentiment) trend as the topic variance. For instance, the topic tracking system 106 can perform a statistical analysis (e.g., a regression analysis) to determine if a particular topic is causing a change in sentiment towards the topic and/or to a large group of respondents (i.e., a topic is affecting the sentiment of a large portion of the customer base). In particular, the topic tracking system 106 can perform a statistical analysis to analyze a topic label and the effect (or correlation) of the topic label on the overall sentiment between the response models (e.g., a negative sentiment in the topic is causing a negative sentiment for a large number of respondents, a positive sentiment in the topic is correlating with a positive sentiment in another topic and/or the survey responses overall). Moreover, the topic tracking system 106 can perform a statistical analysis to determine that a topic generally is associated with a specific sentiment (e.g., determining that shipping is usually associated with a negative sentiment). Indeed, the topic tracking system 106 can perform such statistical analyses for any type of topic variance identified in accordance with one or more embodiments herein.

Upon identifying one or more topic variances based on one or more response models, the topic tracking system 106 can also select topic variances to utilize in the digital survey reporting structure and/or for notifications. For instance, the topic tracking system 106 can select one or more topic variances from the topic variances identified from analyzing the one or more response models. In particular, the topic tracking system 106 can select topic variances based on thresholds (e.g., topic variances that exceed and/or fall below a certain criteria). For instance, the topic tracking system 106 can select topic variances that exceed and/or fall below a threshold percentage of change in trend (e.g., above or below a threshold percentage of 30%). In some embodiments, the topic tracking system 106 can select topic variances that have gained a negative sentiment. In some embodiments, the topic tracking system 106 can select the top changes from the topic variances based on a threshold number of topic variances to select (e.g., select the top five topic variances based on an assigned threshold number of five). Indeed, the thresholds and/or other preferences on which topic variances to select can be configured on the administrator device 110.

As mentioned above, the topic tracking system 106 can analyze digital survey responses to generate one or more clusters to generate a response model. For instance, in one or more embodiments, the topic tracking system 106 generates clusters from digital survey responses. In particular, the topic tracking system 106 can generate word clusters from digital survey responses that represent one or more topics (e.g., a topic cluster). Indeed, the topic tracking system 106 can generate the clusters from the digital survey responses by analyzing the relations between one or more words within a set of digital survey responses. For instance, in some embodiments the topic tracking system 106 utilizes a vector-based model (e.g., to create a word embedding space) to identify relationships of words (and/or other words) from the set of digital survey responses and generates (or determines) topic clusters from those relationships. Indeed, the topic tracking system 106 generates (or determines) topic clusters utilizing one or more approaches as described in Jiajia Huang, Min Peng, Huan Wang, Jinli Cao, Gao Wang, and Xiuzhen Zhang, *A Probabilistic Method for Emerging Topic Tracking in Microblog Stream*, World Wide Web (2017) 20: 325. https://doi.org/10.1007/s11280-016-0390-4 (2016), which is hereby incorporated by reference.

Figure 5A:
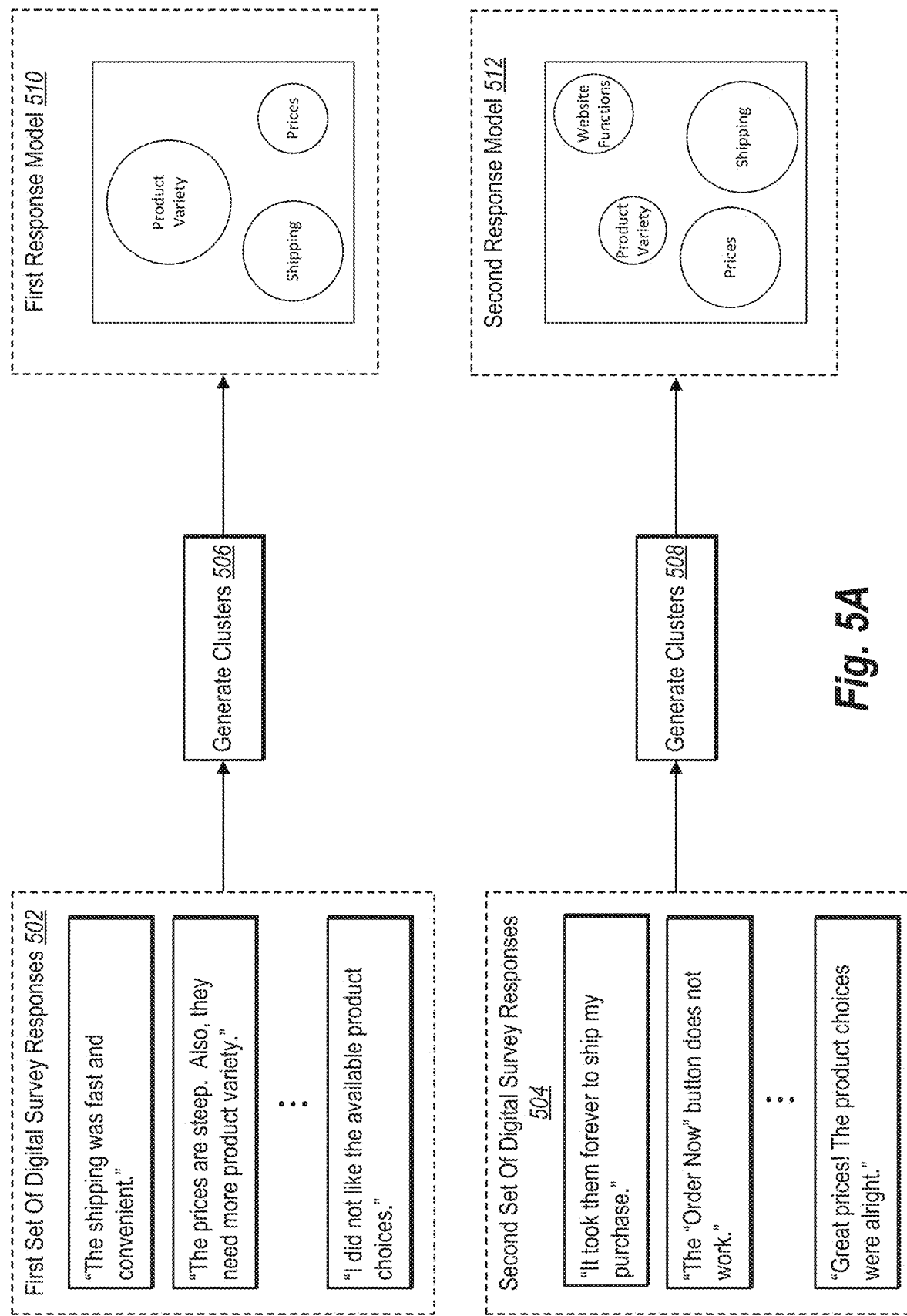
FIG. 5A illustrates a topic tracking system generating response models that include clusters from sets of digital survey responses in accordance with one or more embodiments.

Furthermore, the topic tracking system 106 can represent topic clusters determined from the one or more digital survey responses in various formats such as, but not limited to, a data set, graph, list, data table, and/or array. Although FIG. 5A illustrates the topic tracking system 106 generating one or more clusters as a visual representation of each topic cluster labeled as the topic, each generated cluster can include other information such as, but not limited to, historical frequency of the topic (or a term) and/or the predicted future frequency of the topic. Furthermore, the topic tracking system 106 can generate (and/or utilize) response models for topic detection based on methods such as, but not limited to, latent Dirichlet allocation ("LDA"), biterm topic modelling ("BTM"), bursty biterm topic modelling ("BBTM"), pattern clustering, text clustering, and/or word probability distribution as described in Jiajia Huang, Min Peng, Huan Wang, Jinli Cao, Gao Wang, and Xiuzhen Zhang, *A Probabilistic Method for Emerging Topic Tracking in Microblog Stream*, World Wide Web (2017) 20: 325. https://doi.org/10.1007/s11280-016-0390-4 (2016), which is hereby incorporated by reference.

As an example, FIG. 5A illustrates the topic tracking system 106 generating a response model by generating clusters from digital survey responses. In particular, FIG. 5A illustrates the topic tracking system 106 analyzing digital survey responses from a first set of digital survey responses 502, which includes survey responses such as "the shipping was fast and convenient" and "I did not like the available product choices," to generate, in act 506, a first response model 510 which includes clusters (e.g., topic clusters) such as "product variety," "shipping," and "prices." Furthermore, FIG. 5A also illustrates the topic tracking system 106 analyzing the digital survey responses from a second set of digital survey responses 504, which includes survey responses such as "it took them forever to ship my purchase" and "the 'order now' button does not work," to generate, in act 508, a second response model 512 which includes clusters such as "product variety," "shipping," "prices," and "website functions."

Additionally, as mentioned above, the topic tracking system 106 can identify a topic variance from one or more response models that include topic clusters. In particular, the topic tracking system 106 can analyze the one or more response models that include topic clusters to identify a topic variance between the sets of digital survey responses. Indeed, in one or more embodiments, the topic tracking system 106 can analyze the one or more response models that include topic clusters to identify a topic variance such as an emerging topic and a growing and/or a fading topic (e.g., a change in trend for a topic).

For example, in one or more embodiments, the topic tracking system 106 analyzes one or more response models that include topic clusters to identify an emerging topic as a topic variance. In particular, an emerging topic can include a new topic that was not detected in previous response models. Furthermore, an emerging topic can include a new topic that the topic tracking system 106 determines as being a topic that will remain popular (or significant) in the future rather than fading (e.g., becoming seldomly mentioned) shortly thereafter. In some embodiments, the topic tracking system 106 can identify a new topic that is not significant (e.g., a new topic that is predicted or determined to not remain popular and/or to not be frequently mentioned in the future) as a noisy topic rather than an emerging topic.

Furthermore, in some embodiments, an emerging topic can include specific information associated with a topic. In particular, an emerging topic can include significant information such as a subtopic related to the topic that is identified from the one or more response models. As an example, the topic tracking system 106 can identify that survey respondents began discussing speed in relation to shipping as an emerging topic. In particular, the topic tracking system 106 can identify specific topics within a topic cluster (e.g., subtopics) as emerging topics (e.g., identifying as an emerging topic that survey respondents are talking about a first topic "shipping" and a second topic "speed" in similar ways). Indeed, the topic tracking system 106 can determine themes and/or other terms associated with topic clusters to identify (and/or provide) recommendations based on the identified emerging topic (e.g., identifying that survey respondents are referring to a topic with a new term).

In addition to emerging topics, the topic tracking system 106 can analyze response models that include topic clusters to identify growing and/or fading (e.g., submerging) topics. For instance, a fading topic can include a topic that was frequently detected in previous response models and is not as frequently detected in the more recent response model. Moreover, a growing topic can include a topic that was less frequently detected in previous response models and is more frequently detected in the more recent response model (e.g., a response model based on a current set of digital survey responses).

For example, the topic tracking system 106 can analyze the one or more response models that include topic clusters to identify topic variances by comparing the response models (e.g., diffing the response models). In particular, the topic tracking system 106 can compare the one or more response models to identify new topic clusters existing in a more recent response model in comparison to previous response models. Indeed, the topic tracking system 106 can utilize the identified new topic clusters as the identified topic variances (e.g., emerging topics).

In addition, the topic tracking system 106 can analyze the one or more response models that include topic clusters by comparing the response models to identify a topic variance such as a change in a trend for a topic. In particular, the topic tracking system 106 can compare the one or more response models to identify a change in size for a topic cluster based on information associated with the topic cluster such as a proportion and/or a number of mentions of the topic. Specifically, the topic tracking system 106 can identify a growing topic as the topic variance if a topic cluster, in a response model, has enlarged (or grown) in comparison to the same topic cluster in previous response models based on the number of mentions associated with the topic cluster. Furthermore, the topic tracking system 106 can identify a fading topic as the topic variance if the topic cluster, in a response model, has reduced in size in comparison to the same topic cluster in previous response models based on the number of mentions associated with the topic cluster.

Moreover, in one or more embodiments, the topic tracking system 106 analyzes the one or more response models that include topic clusters (or topic information) to identify topic variances such as emerging topics, growing topics, and/or fading topics by utilizing various methods such as, but not limited to, methods based on a local weighted linear regression, optimization learners, and/or Kullback-Leibler divergence ("KLD") as described in Jiajia Huang, Min Peng, Huan Wang, Jinli Cao, Gao Wang, and Xiuzhen Zhang, *A Probabilistic Method for Emerging Topic Tracking in Microblog Stream*, World Wide Web (2017) 20: 325. https://doi.org/10.1007/s11280-016-0390-4 (2016), which is incorporated by reference herein.

Additionally, the topic tracking system 106 can utilize other methods such as Jensen-Shannon Divergence to identify topic variances. In some embodiments, the topic tracking system 106 utilizes approaches such as first story detection ("FSD") to identify topic variances such as emerging topics. Furthermore, in some embodiments, the topic tracking system 106 utilizes FSD, Attention-based Aspect Extraction ("ABAE"), and/or other neural networks based methods to identify topic variances such as emerging topics. Furthermore, the topic tracking system 106 can utilize a linear fit polynomial regression and/or a normalized estimate to identify topic variances. Moreover, in some embodiments, the topic tracking system 106 utilizes optimization tools (or packages) such as CVXPY (built on CVXOPT) for convex optimization problems to identify topic variances such as emerging topics, growing topics, and/or fading topics.

Furthermore, upon identifying one or more topic variances, such as emerging topics, the topic tracking system 106 can select topic variances to utilize in the digital survey reporting structure and/or for notifications based on thresholds and/or other preferences as described above in FIG. 4. For instance, the topic tracking system 106 can select a topic variance such as an emerging topic when the topic is determined to be new and meets a threshold frequency (e.g., exceeds and/or falls below a threshold number of mentions). In some embodiments, the topic tracking system 106 selects the top threshold number of identified emerging topics (e.g., selecting the top threshold number of emerging topics based on the number of mentions of each emerging topic). Indeed, the thresholds and/or other preferences on which topic variances to select can be configured on the administrator device 110 in accordance with the one or more embodiments herein.

Figure 5B:
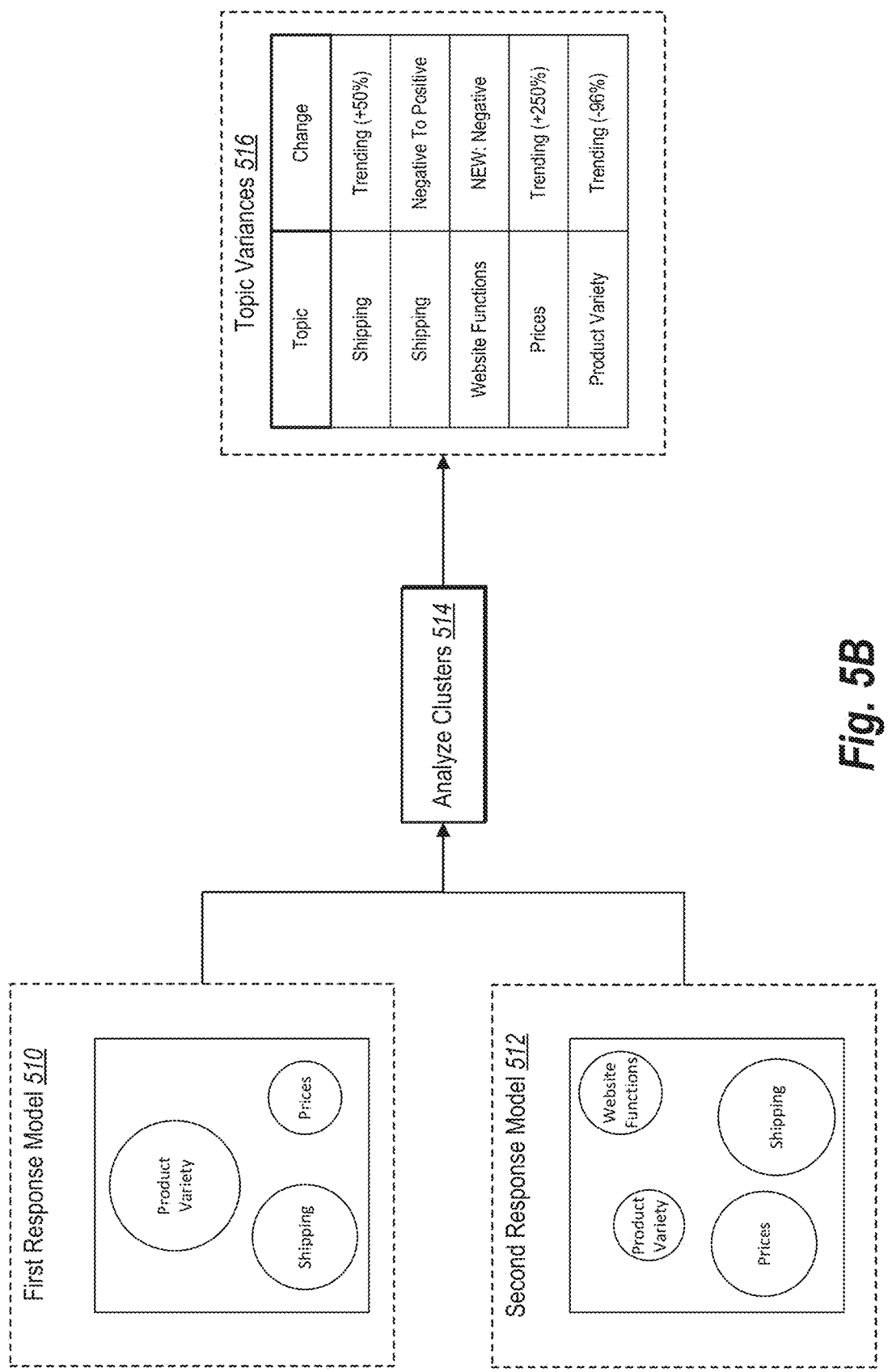
FIG. 5B illustrates a topic tracking system identifying topic variances in accordance with one or more embodiments.

As an example, FIG. 5B illustrates the topic tracking system 106 utilizing response models that include one or more clusters to identify topic variances. In particular, as shown in FIG. 5B, the topic tracking system 106 can, in act 514, analyze clusters (e.g., "product variety," "shipping," and "prices") from a first response model 510 and clusters (e.g., "product variety," "shipping," "website functions," and "prices") from a second response model 512 to identify topic variances 516. For instance, as illustrated in FIG. 5B, the topic tracking system 106 identifies a topic of "website functions" as an emerging topic based on the topic cluster of "website functions" being present in the second response model 512 but not in the first response model 510 (e.g., the change in topic variances 516 is indicated as "NEW" for the topic of "website functions"). Moreover, FIG. 5B also illustrates the topic tracking system 106 identifying growing and fading topics as topic variances (e.g., changes in trend for topics). For instance, as shown in FIG. 5B, the topic tracking system 106 identifies the topic of "product variety" as trending negatively in topic variances 516 (e.g., "Trending (−96%)") based on the size of the topic cluster of "product variety" becoming smaller (based on information associated with the topic cluster) from the first response model 510 to the second response model 512. Additionally, as illustrated in FIG. 5B, the topic tracking system 106 identifies the topic of "prices" as trending positively in topic variances 516 (e.g., "Trending (+250%)") based on the size of the topic cluster of "prices" becoming larger (based on information associated with the topic cluster) from the first response model 510 to the second response model 512.

Furthermore, the topic tracking system 106 can utilize both response attributes and topic clusters in a response model to identify one or more topic variances. For instance, the topic tracking system 106 can generate a response model that includes both topic clusters and response attributes such as, but not limited to, sentiment values for topics. Furthermore, the topic tracking system 106 can analyze the response models including both the topic clusters and the response attributes to identify various topic variances in accordance with one or more embodiments described herein. For instance, the topic tracking system 106 can identify a sentiment value associated with an emerging topic that is identified from the topic clusters (e.g., by determining the digital survey responses associated with the emerging topic and the sentiment values associated with those digital survey responses). For instance, as shown in FIG. 5B, the topic tracking system 106 can identify the topic "website functions" as a new topic and identify that the topic "website functions" is associated with a negative sentiment (e.g., the change in topic variances 516 is indicated as "NEW: Negative" for the topic of "website functions"). Furthermore, the topic tracking system 106 can associate statistical analyses performed on information associated with digital survey responses and/or topic labels (in accordance with one or more embodiments herein) to a topic cluster.

Moreover, the topic tracking system 106 can combine topic variances identified from analyzing response models that include response attributes and/or topic clusters in accordance with one or more embodiments herein. Indeed, the topic tracking system 106 can identify topic variances by analyzing response attributes from one or more sets of digital surveys and/or response models, analyzing topic clusters associated with one or more response models, and analyzing both response attributes and topic clusters associated with one or more response models to identify topic variances. Then the topic tracking system 106 can select topic variances to utilize in the digital survey reporting structure and/or for notifications based on thresholds and/or other preferences (as described in one or more embodiments herein).

Furthermore, the topic tracking system 106 can utilize any variety of methods and/or embodiments described herein (e.g., Jensen-Shannon Divergence, FSD, ABAE, cluster based analyses, and/or other neural network based methods) to identify and/or utilize topic variances across a range of time. For instance, the topic tracking system 106 can compare response models numerous times along a timeline (e.g., every week, every month, etc.) to identify and/or utilize topic variances. In particular, the topic tracking system 106 can compare response models along a time line by, but not limited to, comparing an updated subsequent response model to previous response models and/or by comparing two newly generated response models along a timeline. Additionally, the topic tracking system 106 can identify and/or utilize topic variances within a time series. For instance, the topic tracking system 106 can associate identified topic variances with a time within a timeline based on the multiple comparisons (in accordance with one or more embodiments herein) of response models along the timeline.

Figure 6:
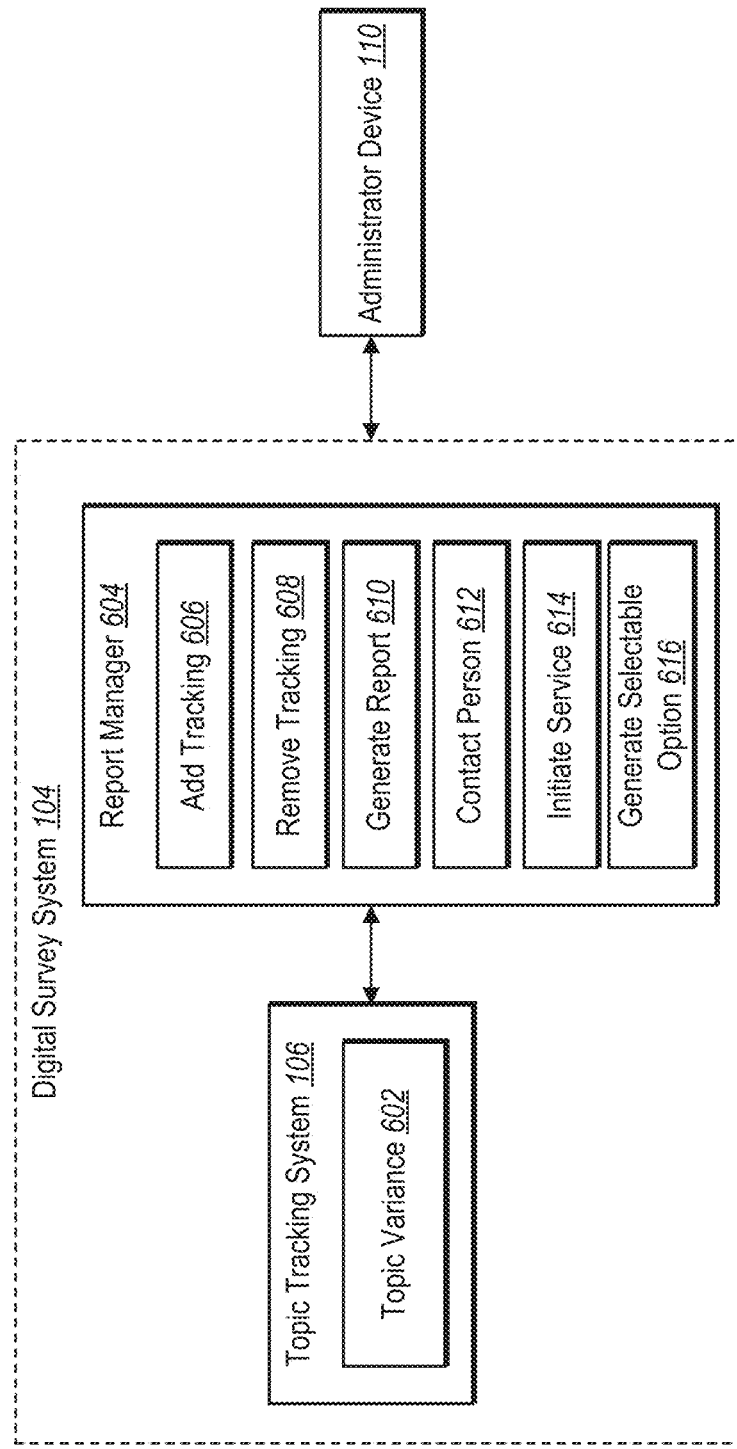
FIG. 6 illustrates a flow diagram of a topic tracking system modifying a digital survey reporting structure in accordance with one or more embodiments.

As mentioned above, the topic tracking system 106 can modify a digital survey reporting structure based on a topic variance. In particular, the topic tracking system 106 can modify the digital survey reporting structure based on a topic variance in various ways. For instance, FIG. 6 illustrates various actions from the topic tracking system 106 that modify the digital survey reporting structure (of one or more digital surveys) based on a topic variance. For example, the topic tracking system 106 can begin tracking a topic associated with the topic variance, terminate the tracking of a topic associated with the topic variance, generate reports for information associated with the topic variance, contact a person that is associated with the topic variance, and/or initiate a service based on the topic variance. Although, one or more embodiments describe the topic tracking system 106 modifying the digital survey reporting structure based on one topic variance, the topic tracking system 106 can modify the digital survey reporting structure based a combination of more than one topic variance (from one or more digital surveys).

Furthermore, the topic tracking system 106 can modify the digital survey reporting structure based on a topic variance by communicating (e.g., sending, receiving, and/or interacting) with the administrator device 110 and/or other components of the digital survey system 104. For instance, as shown in FIG. 6, the topic tracking system 106 can modify the digital survey reporting structure based on a topic variance 602 by communicating with the administrator device 110 and/or the report manager 604 (e.g., via the digital survey system 104). Indeed, in one or more embodiments, the topic tracking system 106 accomplishes various actions (such as the actions listed above) to modify the digital survey reporting structure based on a topic variance by communicating with the administrator device and/or other components of the digital survey system 104 (e.g., a report manager).

Furthermore, the topic tracking system 106 can take various actions (such as the actions listed above) to modify the digital survey reporting structure automatically and/or after receiving commands. For instance, the topic tracking system 106 can take various actions to modify the digital survey reporting structure, automatically, upon identifying a topic variance. In some embodiments, the topic tracking system 106 takes various actions to modify the digital survey reporting structure based on a topic variance after receiving commands from the administrator device 110. For instance, the topic tracking system 106 can take various actions to modify the digital survey reporting structure based on a topic variance after receiving commands in response to notifications and/or selectable options provided to the administrator device 110 in accordance with one or more embodiments herein.

As illustrated in FIG. 6, the topic tracking system 106 can cause the report manager 604 to add tracking, in act 606, for information associated with the topic variance 602. For instance, in one or more embodiments, the topic tracking system 106 causes a digital survey reporting structure (e.g., the report manager 604) to track a topic associated with a topic variance upon identifying the topic variance. In particular, the topic tracking system 106 can cause the digital survey reporting structure of the digital survey system 104 to maintain track of information associated with the topic associated with the topic variance such as, but not limited to, subsequent mentions of the topic from survey respondents, sentiment value for the topic from subsequent mentions of the topic, and/or determine other statistics based on survey respondent information for the topic (e.g., based on demographics). Additionally, the topic tracking system 106 can track (or determine) survey respondents that have mentioned the topic associated with the topic variance. Furthermore, the topic tracking system 106 can cause the digital survey reporting structure to track the topic associated with the topic variance for specific administrator devices (from a plurality of administrator devices) based on information related to the topic variance, information related to the digital surveys from which the topic variance was identified, and/or preferences provided by one or more administrator devices.

In one or more embodiments, the topic tracking system 106 causes the report manager 604 to add tracking for a topic associated with a topic variance prior to approval from the administrator device 110. For example, the topic tracking system 106 can cause the report manager 604 to create a log (e.g., a rolling history log) that includes information gathered while tracking the topic prior to receiving a command from the administrator device 110 to track the topic. Indeed, the topic tracking system 106 can cause the report manager 604 to provide (or report) the information (e.g., the historical tracked information for a topic) to the administrator device 110 after the administrator device 110 provides a command to track the topic to include information that is tracked for the topic prior to the administrator device 110 reviewing and/or responding to notifications and/or recommendations for the topic associated with the topic variance.

Moreover, as shown in FIG. 6, the topic tracking system 106 can cause the report manager 604 to remove tracking, in act 608, for information associated with the topic variance 602. For instance, the topic tracking system 106 can cause a digital survey reporting structure (e.g., the report manager 604) to discontinue tracking of a topic associated with a topic variance upon identifying the topic variance. For instance, the topic tracking system 106 can cause the digital survey reporting structure of the digital survey system 104 to discontinue the tracking of information such as, but not limited to, subsequent mentions of the topic from survey respondents, sentiment value for the topic from subsequent mentions of the topic, and/or discontinue determining other statistics based on survey respondent information for the topic (e.g., based on demographics). Additionally, the topic tracking system 106 can cause the digital survey reporting structure to discontinue tracking the topic associated with the topic variance for specific administrator devices (from a plurality of administrator devices) based on information related to the topic variance, information related to the digital surveys from which the topic variance was identified, and/or preferences provided by one or more administrator devices.

Additionally, as illustrated in FIG. 6, the topic tracking system 106 can cause the report manager 604 to generate a report, in act 610, for information associated with the topic variance 602. For example, the topic tracking system 106 can cause a digital survey reporting structure (e.g., the report manager 604) to generate one or more reports based on a topic associated with a topic variance upon identifying the topic variance. In particular, the topic tracking system 106 can cause the digital survey reporting structure to generate reports based on information associated with the topic and/or topic variance such as, but not limited to, the frequency of mentions for the topic, the proportion of the topic within one or more sets of digital survey responses, statistics for the sentiment value associated with the topic, historical data associated with the topic variance, and/or statistics based on survey respondent information for the topic (e.g., demographic information of survey respondents that mentioned the topic). For instance, the topic tracking system 106 can cause the digital survey reporting structure to generate one or more reports that include information associated with sentiment values associated with the topic and/or topic variance such as, but not limited to, proportions of various types of sentiment values associated with the topic from one or more sets of digital survey responses, changes in sentiment values, predictions for sentiment values for the topic, and/or statistics based on survey respondent information for the sentiment values associated with the topic (e.g., demographic information of survey respondents that mentioned the topic).

In addition, the topic tracking system 106 can cause the digital survey reporting structure to generate one or more reports based on subsequently tracked information for the topic associated with the topic variance. For example, the topic tracking system 106 can cause the digital survey reporting structure to initiate tracking of the topic associated with the topic variance and also generate one or more reports based any information for the topic acquired after tracking the topic. For instance, the topic tracking system 106 can cause the digital survey reporting structure to generate the one or more reports and continue to update the one or more reports as one or more subsequent survey responses are received by the digital survey system and/or update the one or more reports upon receiving a set of digital survey responses based on preferences and/or configurations in accordance with one or more embodiments described herein. Furthermore, the topic tracking system 106 can also cause the digital survey reporting structure to generate one or more reports based on one or more response models generated in accordance with one or more embodiments described herein.

In particular, the topic tracking system 106 can cause a digital survey reporting structure to generate various types of reports based on a topic variance associated with a topic. For instance, the topic tracking system 106 can cause the digital survey reporting structure to generate reports in formats such as, but not limited to, pie charts, bar graphs, data tables, line graphs, lollipop charts, and/or histograms. Indeed, the topic tracking system 106 can cause the digital survey reporting structure to display (or present) the one or more reports on a user interface (e.g., a user interface on the administrator device 110) associated with the digital survey system 104.

In one or more embodiments, the topic tracking system 106 causes the digital survey reporting structure to generate a visual representation of one or more response models (e.g., a visual representation of topic clusters). In particular, the topic tracking system 106 can cause the digital survey reporting structure to generate a visual representation of one or more topic clusters with sizes that are proportional to information associated with the topic clusters (e.g., sentiment values, mentions, etc.). Indeed, in one or more embodiments, the topic tracking system 106 can cause the digital survey reporting structure to display information associated with a topic cluster in the visual representation of one or more topic clusters (e.g., displayed within the topic clusters, displayed upon receiving an interaction with a topic cluster such as a hover action or a click, and/or displayed elsewhere on a user interface). Furthermore, the topic tracking system 106 can cause the digital survey reporting structure to visually represent changes in the response models based on any of or any combination of interactions from the administrator device 110, a topic variance, historical information associated with a topic and/or updated information associated with a topic. For example, in some embodiments, the topic tracking system 106 can cause the digital survey reporting structure to generate a visual representation of one or more topic clusters from multiple compared (e.g., diffed) response models to highlight and/or display the emerging topics.

Additionally, the topic tracking system 106 can cause the digital survey reporting structure to morph (e.g., change in size) one or more topic clusters that are visually represented based on historical and/or updated information associated with a topic (e.g., change the sizes of the one or more topic clusters based on a change in proportions of mentioned topics, change in trends for the topics, and/or change in sentiment value for the one or more mentioned topics). In some embodiments, the topic tracking system 106 causes the digital survey reporting structure to visually represent a morphing of one or more topic clusters over a time period based on selections of time from the administrator device 110. In one or more embodiments, the topic tracking system 106 causes the digital survey reporting structure to generate a visual representation of one or more response models within a constellation graph (or diagram). For instance, the topic tracking system 106 causes the digital survey reporting structure to generate constellation graph (or diagram) to represent one or more topic clusters as symbols (or data points) corresponding to a visual representation of an amplitude of each topic cluster based on information associated with the one or more topic clusters.

Furthermore, as shown in FIG. 6, the topic tracking system 106 can cause the report manager 604 to contact a person, in act 612, corresponding to the information that is associated with the topic variance 602. For example, in one or more embodiments, the topic tracking system 106 can cause a digital survey reporting structure (e.g., the report manager 604) to contact one or more persons upon identifying a topic variance. In particular, the topic tracking system 106 can cause the digital survey reporting structure to contact one or more persons that are associated with the topic corresponding to the topic variance. As an example, upon identifying a negative sentiment value for a topic of "website functions," the topic tracking system 106 can cause the digital survey reporting structure to contact a technical support team to investigate and/or resolve the issues associated with the topic "website functions" in the digital survey responses. As another non-limiting example, upon identifying a negative sentiment value for a topic of "shipping," the topic tracking system 106 can cause the digital survey reporting structure to contact a shipping manager (e.g. a person designated by the administrator device 110).

Indeed, the topic tracking system 106 can determine the contact based on preferences configured by the administrator device 110. For instance, the administrator device 110 can provide preferences and/or assign contacts based on the digital surveys from which the topic variance was identified and/or based on topics. For instance, the topic tracking system 106 can receive contact preferences (e.g., information on a person to contact) for a specific tracked topic from the administrator device 110.

Moreover, as illustrated in FIG. 6, the topic tracking system 106 can cause the report manager 604 to initiate a service, in act 614, corresponding to information that is associated with the topic variance 602. For instance, in some embodiments, the topic tracking system 106 can cause a digital survey reporting structure (e.g., the report manager 604) to initiate one or more services (e.g., a response specific action and/or action planning) upon identifying a topic variance. In particular, the topic tracking system 106 can cause the digital survey reporting structure to initiate one or more services (e.g., a response specific action) that are based on the topic variance such as, but not limited to, contacting survey respondents associated with the topic variance and/or triggering a support request (e.g., a support ticket) for survey respondents associated with the topic variance.

For instance, for an identified topic variance that indicates that the topic of "shipping" is associated with a negative sentiment value instead of a positive sentiment value, the topic tracking system 106 can cause the digital survey reporting structure to distribute a message (e.g., via email) to survey respondents that have mentioned shipping with questions related to the topic of "shipping." Furthermore, as an example, the topic tracking system 106 can cause the digital survey reporting structure to trigger a technical support ticket for each survey respondent that submitted a survey response associated with the topic of "website function" when the topic tracking system 106 identifies a topic variance for the topic "website function." In addition, the topic tracking system 106 can cause the digital survey reporting structure to initiate a service based on a topic variance in accordance to one or more preferences and/or settings (as described in one or more embodiments herein) from the administrator device 110 (e.g., triggering a support ticket for survey respondents associated with a topic and sentiment value when the survey respondent has a purchase history greater than a threshold amount such as $500).

Additionally, as illustrated in FIG. 6, the topic tracking system 106 can cause the report manager 604 to generate a selectable option, in act 616, based on information associated with the topic variance 602. For instance, the topic tracking system 106 can cause a digital survey reporting structure (e.g., the report manager 604) to generate one or more selectable options based on a topic variance upon identifying the topic variance. In particular, the topic tracking system 106 can cause the digital survey reporting structure to generate one or more selectable options that enable the administrator device 110 to select the one or more selectable options in order to initiate one or more of the various actions associated with the topic variance as described in one or more embodiments herein (e.g., adding a topic, removing a topic, generating a report, contacting a person, and/or initiating a service based on the topic variance). Indeed, the topic tracking system 106 can cause the digital survey reporting structure to display the one or more selectable options on a user interface (e.g., a user interface on the administrator device 110). Moreover, in some embodiments, the topic tracking system 106 causes the digital survey reporting structure to display the selectable option within a generated notification based on a topic variance (as described in one or more embodiments below).

Moreover, the topic tracking system 106 can take various actions to modify a digital survey reporting structure based on a topic variance based on one or more filters, preferences, and/or settings of the one or more sets of digital survey responses, the one or more response models, and/or the one or more topic variances as described in one or more embodiments herein. In particular, the topic tracking system 106 can cause the digital survey reporting structure to add tracking, remove tracking, generate reports, contact a person, initiate a service, and/or generate a selectable option based on a topic variance based on one or more filters, preferences, and/or settings as described in one or more embodiments herein. For example, the topic tracking system 106 can cause the digital survey reporting structure to add tracking for a topic associated with a topic variance on an administrator device associated with filters, preferences, and/or settings that are associated with the digital survey responses in which the topic variance was identified (e.g., tracking a topic on an administrator device that is specific to a region and/or department). Additionally, as an example, the topic tracking system 106 can cause the digital survey reporting structure to generate a report for a topic associated with a topic variance based on filters, preferences, and/or settings associated with the digital survey responses in which the topic variance was identified (e.g., generating a report that is specific to a region).

Figure 7:
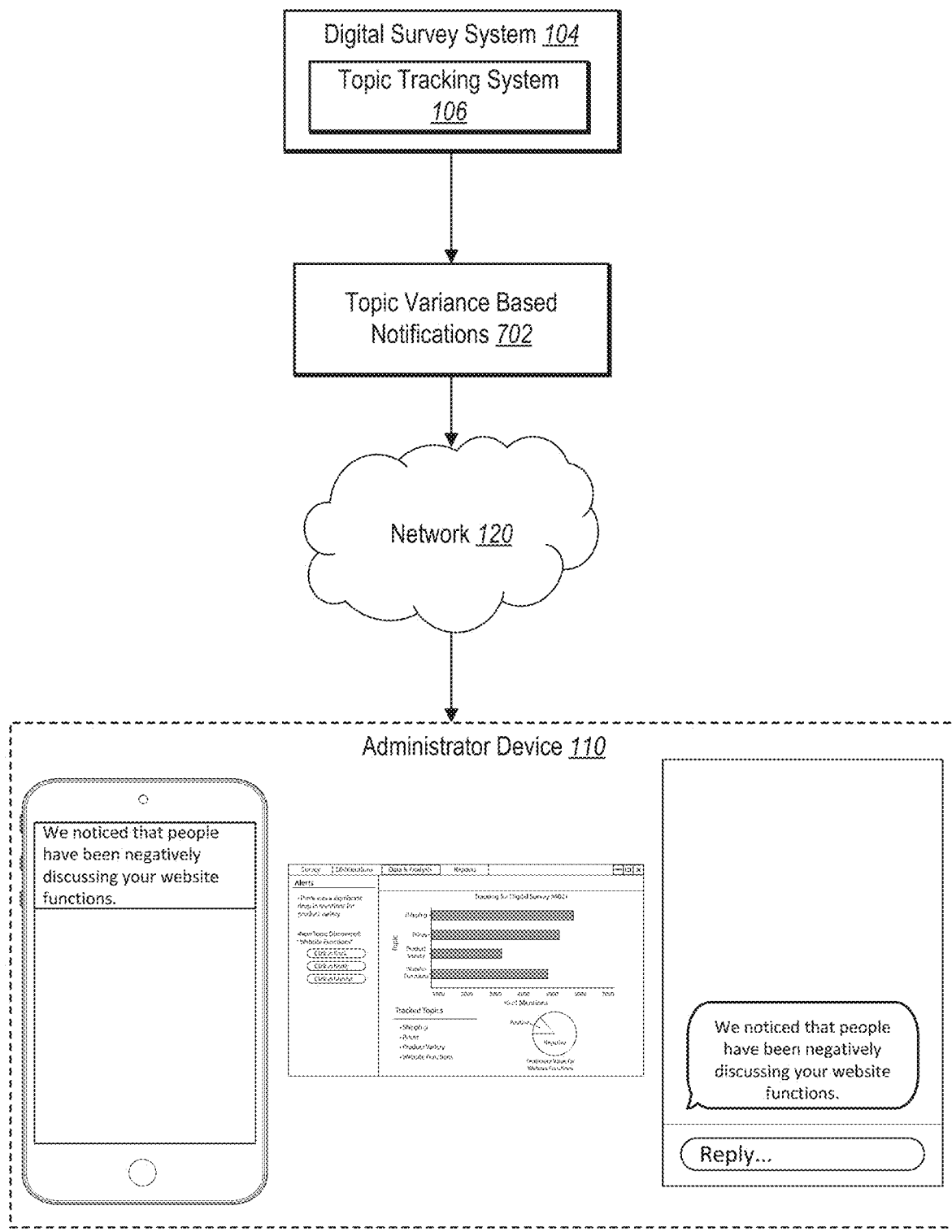
FIG. 7 illustrates a topic tracking system generating notifications based on a topic variance in accordance with one or more embodiments.

As mentioned above, the topic tracking system 106 can generate a notification based on a topic variance. In particular, the topic tracking system 106 can generate one or more notifications based on a topic variance and provide the one or more notifications to various user interfaces of the administrator device 110 in various formats. For instance, FIG. 7 illustrates the topic tracking system 106 (via digital survey system 104) providing a notification based on a topic variance to display the notification in various formats on one or more user interfaces. As shown in FIG. 7, the topic tracking system 106 can generate and distribute topic variance based notifications 702 to the administrator device 110 (via a network 120). Furthermore, as illustrated in FIG. 7, the topic tracking system 106 can provide the topic variance based notifications 702 in various formats.

For instance, in one or more embodiments, the topic tracking system 106 generates and/or distributes one or more notifications based on a topic variance based on one or more preferences (or settings) provided by the administrator device 110. For example, the topic tracking system 106 can receive preferences (or settings) that specify rules for generating and/or distributing a notification based on the type of topic variance, a category of topics, and/or the information associated with the topic variance. For instance, the topic tracking system 106 can receive preferences to provide an email message to all administrator devices associated with the one or more digital surveys associated with the identified topic variance when the topic variance is a change in sentiment value or an emerging topic. Furthermore, as an example, the topic tracking system 106 can receive preferences to provide a notification within a user interface for the digital survey when the topic variance is a downward trend in mentions of a topic. Furthermore, in some embodiments, the topic tracking system 106 receives preferences to provide a notification for a topic variance for a specific topic to a specific administrator device (e.g., provide all notifications for identified topic variances related to the topic of "shipping" to an administrator device associated with a shipping manager).

Additionally, the topic tracking system 106 can generate (and/or distribute) notifications, based on a topic variance, in various formats. For example, the topic tracking system 106 can generate (and/or distribute) notifications based on a topic variance in various formats such as, but not limited to, text messages, emails, voice mail, and/or device notifications (e.g., a mobile device notification), messages within a user interface (e.g., alerts within a dashboard and/or notification center in a digital survey user interface). For instance, the topic tracking system 106 can generate (and/or distribute) notifications based on a topic variance to the administrator device 110 as a text message.

Moreover, the topic tracking system 106 can generate (and/or distribute) a notification based on a topic variance in various types of message formats. For instance, the topic tracking system 106 can generate (and/or distribute) a notification based on a topic variance in various types of message formats such as, but not limited to, a recommendation, an alert, and/or an interactive notification (or message). For example, the topic tracking system 106 can generate (and/or distribute) the notification based on the topic variance as a recommendation (e.g., "We noticed a change in sentiment for shipping from your customers this month. We recommend reviewing survey responses corresponding to shipping to determine the cause of this sentiment change" and/or "we noticed a negative change in sentiment for customer service this month. We recommend implementing a new training program for customer service"). Furthermore, the topic tracking system 106 can generate (and/or distribute) the notification based on the topic variance as an alert (e.g., "We noticed that people have been negatively discussing your website functions"). Furthermore, the topic tracking system 106 can generate (and/or distribute) the notification based on the topic variance as an interactive notification utilizing selectable options as described in one or more embodiments herein (e.g., interactive notifications in a user interface as described in FIG. 8 and interactive notifications as a message on a device as described in FIG. 10).

Additionally, the topic tracking system 106 can provide one or more notifications based on a topic variance to more than one administrator device (for one or more administrators) based on preferences, settings, and/or filters (e.g., selected regions for the set of digital survey responses in which the topic variance was identified) as described in one or more embodiments herein. Indeed, in one or more embodiments, as shown in FIG. 7, the topic tracking system 106 (via digital survey system 104) can distribute topic variance based notifications 702 over the network 120 to various administrator devices (e.g., via a centralized portal of the digital survey system 104). In particular, the topic tracking system 106 can distribute the topic variance based notifications 702 to any number of administrator devices in any number of formats on various user interfaces of the administrator device 110 (e.g., a mobile alert, a digital survey reporting user interface, and/or a messaging application on the administrator device).

Furthermore, the topic tracking system 106 can also distribute notifications to other client devices (e.g., respondent devices 114). For example, the topic tracking system 106 can generate notifications based on the topic variances for survey respondents 118. As an example, the topic tracking system 106 can generate a notification (e.g., "a lot of customers have mentioned that the ice cream here is great") for an identified emerging topic that has a positive sentiment value (e.g., positive mentions for the emerging topic of ice cream) for survey respondents 118. Indeed, upon generating a notification for survey respondents 118, the topic tracking system 106 can distribute the notification to the respondent devices 114.

Figure 8:
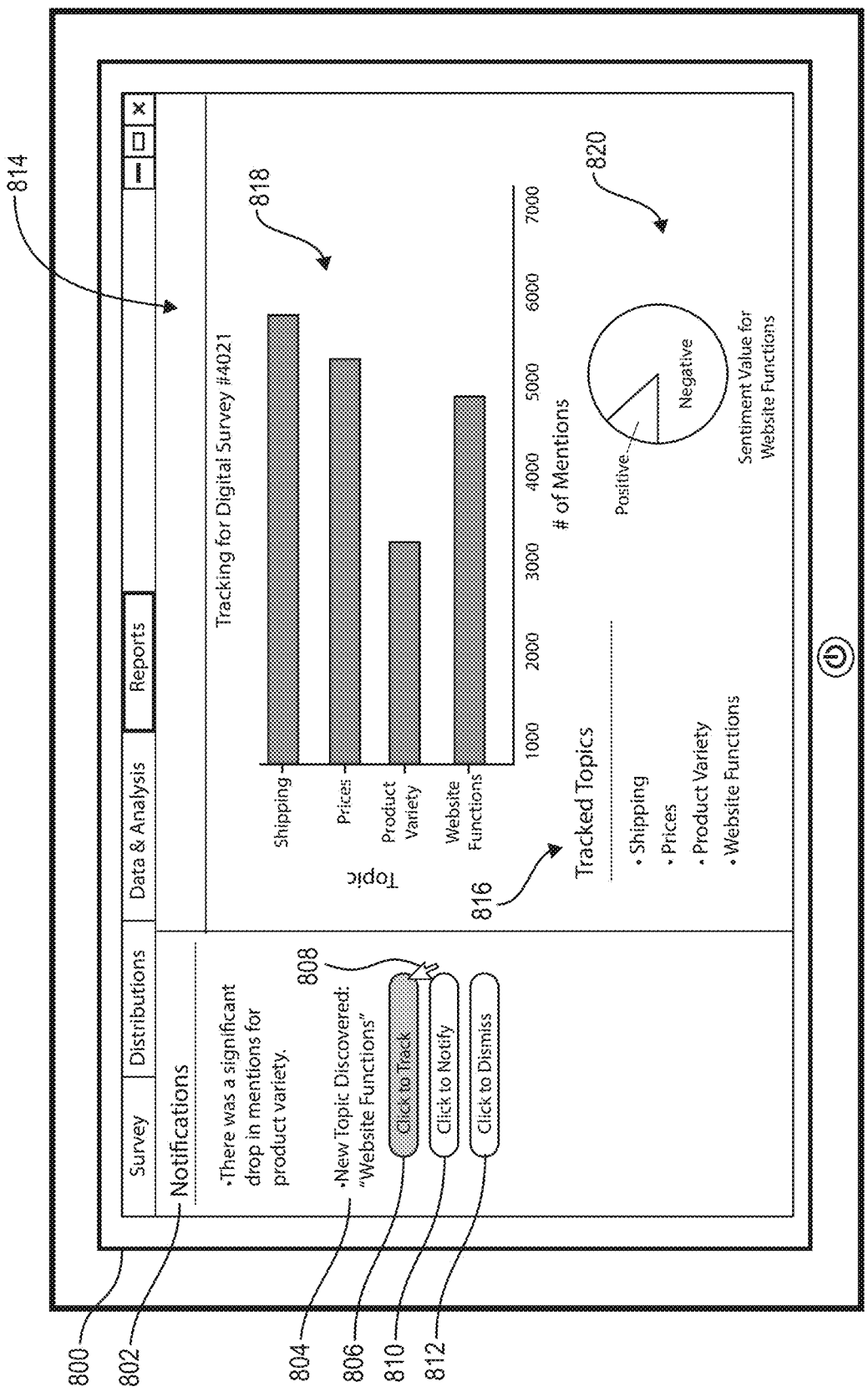
FIG. 8 illustrates a digital survey report generated based on topic variances in accordance with one or more embodiments.

As mentioned above, the topic tracking system 106 can modify a digital survey reporting structure by causing the digital survey reporting structure to generate reports and/or one or more selectable options based on a topic variance. For instance, FIG. 8 illustrates an example of a digital survey reporting user interface 800 that includes reports and one or more selectable options based on one or more topic variances. For example, as shown in FIG. 8, the topic tracking system 106 can cause the digital survey reporting structure to generate the digital survey reporting user interface 800 with notifications 802. Furthermore, as illustrated in FIG. 8, the topic tracking system 106 can cause the digital survey reporting structure to generate the digital survey reporting user interface 800 with digital survey reports 814.

As shown in FIG. 8, the topic tracking system 106 can cause the digital survey reporting structure to generate the digital survey reporting user interface 800 with notifications 802. In particular, as shown in FIG. 8, the notifications 802 include one or more notifications generated by the topic tracking system 106 for identified topic variances in accordance with one or more embodiments herein (e.g., "there was a significant drop in mentions for product variety" and "new topic discovered: "website functions""). Furthermore, as shown in FIG. 8, the topic tracking system 106 can cause the digital survey reporting structure to generate one or more selectable options corresponding to the notification 804 (e.g., "new topic discovered: "website functions"). In particular, as shown in FIG. 8, the one or more selectable options include a click to track option 806, a click to notify option 810, and a click to dismiss option 812.

For example, as illustrated in FIG. 8, the topic tracking system 106 (via the digital survey system 104) can receive a user selection 808 from the administrator device for the click to track option 806. In response to the user selection 808, the topic tracking system 106 can cause the digital survey reporting structure to track the topic associated with the notification 804 (e.g., "website functions") and generate digital survey reports 814 that include the topic (e.g., "website functions"). For instance, as shown in FIG. 8, upon selection of the click to track option 806 for notification 804, the topic tracking system 106 causes the digital survey reporting structure to indicate that the topic of "website functions" is being tracked in the tracked topic list 816.

In addition, upon selection of the click to track option 806 for notification 804, the topic tracking system 106 causes the digital survey reporting structure to track and report the number of mentions associated with tracked topics (e.g., "website functions," "product variety," "prices," and "shipping") in the bar graph 818. Additionally, upon selection of the click to track option 806 for notification 804, the topic tracking system 106 causes the digital survey reporting structure to track and generate sentiment value information for the tracked topic (e.g., "website functions") in the pie chart 820. Although a specific example of a digital survey reporting user interface 800 is shown in FIG. 8, the topic tracking system 106 can modify (or cause) the digital survey reporting structure to generate messages, reports, actions and/or user interfaces for one or more topic variances in accordance with one or more embodiments herein.

Furthermore, as shown in FIG. 8, the topic tracking system 106 can cause the digital survey reporting structure to generate click to notify option 810. Indeed, in one or more embodiments, the topic tracking system 106 (via the digital survey system 104) can receive an indication of a selection of the click to notify option 810. Upon receiving an indication of a selection of the click to notify option 810 the topic tracking system 106 can generate (and/or distribute) one or more notifications based on the topic variance associated with the click to notify option 810 (e.g., "website functions") in accordance with one or more embodiments herein.

Moreover, as illustrated in FIG. 8, the topic tracking system 106 can cause the digital survey reporting structure to generate click to dismiss option 812. Indeed, in one or more embodiments, the topic tracking system 106 (via the digital survey system 104) can receive an indication of a selection of the click to dismiss option 812. Upon receiving an indication of a selection of the click to dismiss option 812 the topic tracking system 106 can disregard the identified topic variance from the notification 804.

Additionally, the topic tracking system 106 can modify settings of the topic tracking system 106 based on interactions with a topic variance from the administrator device 110. For example, the topic tracking system 106 can modify settings of the topic tracking system 106 such as, but not limited to, one or more thresholds for selecting a topic variance, one or more thresholds for identifying a topic as a topic variance, one or more preferences for generating a response model, one or more preferences for modifying the digital survey reporting structure based on a topic variance, and/or one or more preferences for generating (or providing) notifications based on a topic variance. For instance, the topic tracking system 106 can increase the time period for each set of digital survey responses upon receiving one or more dismissals to notifications and/or reports (e.g., an interaction with the click to dismiss option 812). Moreover, as an example, the topic tracking system 106 can tune (or change) the threshold number of digital survey responses that are included in each set of digital survey responses prior to identifying topic variances (in accordance with one or more embodiments herein) upon receiving one or more interactions to notifications and/or reports based on a previously identified topic variance.

Furthermore, the topic tracking system 106 can receive a search query and modify a digital survey reporting structure to provide one or more recommendations based on one or more response models and/or topic variances. For instance, in one or more embodiments, the topic tracking system 106 can receive a search query from the administrator device 110 to search for one or more topics and/or topic variances from one or more response models generated by the topic tracking system 106. Indeed, the topic tracking system 106 can cause the digital survey reporting structure to generate one or more reports based on the search query such as, but not limited to, sentiment values related to the search query term and/or topics related to the search query term from one or more response models.

Figure 9:
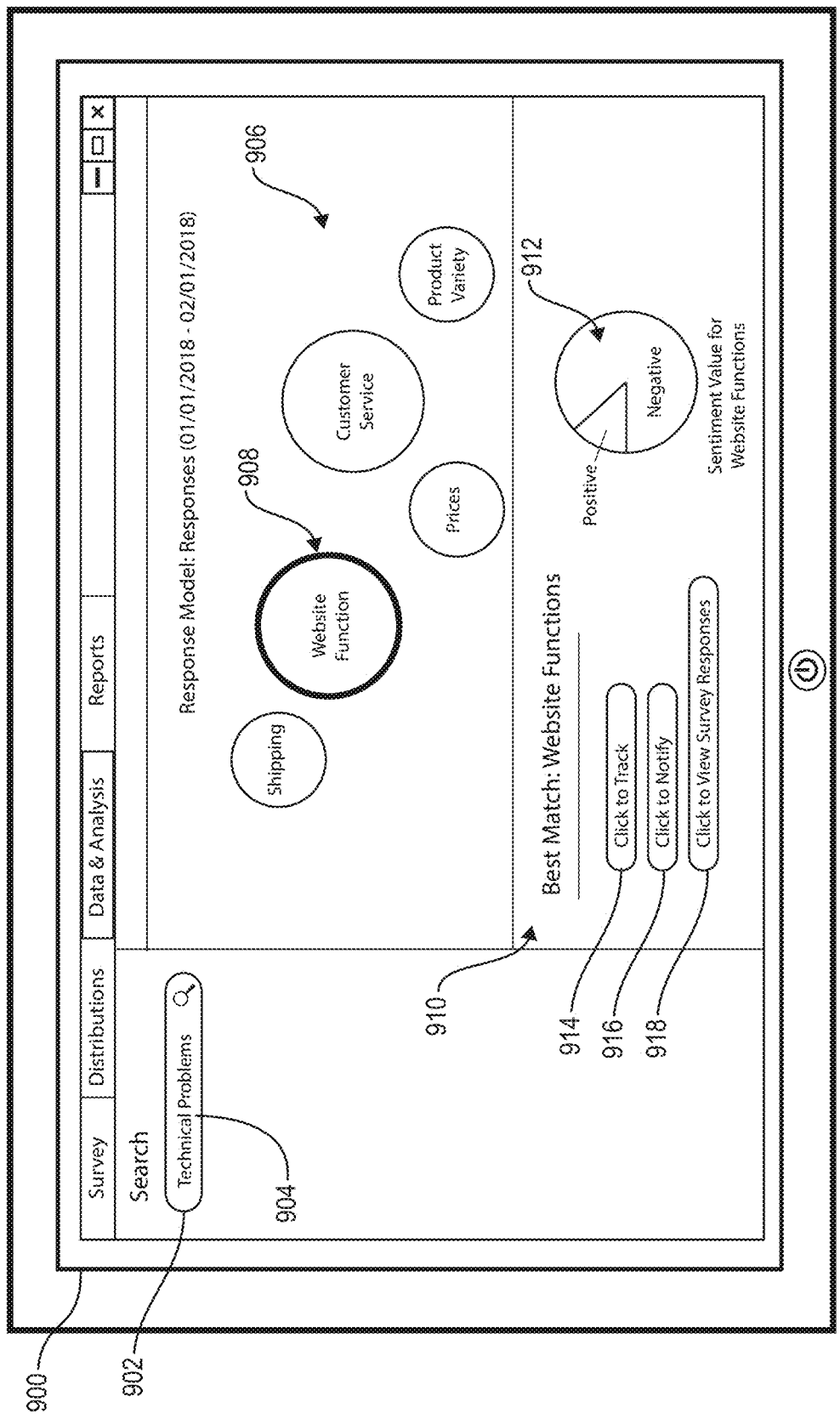
FIG. 9 illustrates a digital survey report based on a search query in accordance with one or more embodiments.

For example, FIG. 9 illustrates the topic tracking system 106 causing a digital survey reporting structure to provide a recommendation from one or more response models and/or topic variances associated with the response models. As shown in FIG. 9, the topic tracking system 106 receives a search query term 904 (e.g., "technical problems") in a search query box 902 within a digital survey reporting user interface 900. Furthermore, as shown in FIG. 9, the topic tracking system 106 causes the digital survey reporting structure to generate a visual representation of one or more topic clusters 906 (e.g., from a response model including digital survey responses between January 2018 through February 2018). In particular, the topic tracking system 106 utilizes a search query term to determine a topic cluster that matches with and/or relates to the search query term. For instance, as shown in FIG. 9, the topic tracking system 106 determines that the topic cluster 908 (e.g., "website functions") relates to the search query term 904 (e.g., "technical problems"). Indeed, as shown in FIG. 9, the topic tracking system 106 can cause the digital survey reporting structure to highlight the topic cluster 908. Additionally, as illustrated in FIG. 9, the topic tracking system 106 can cause the digital survey reporting structure to display sentiment value information associated with the determined topic cluster 908 (e.g., "website functions") in a pie chart 912.

Furthermore, as shown in FIG. 9, the topic tracking system 106 causes the digital survey reporting structure to generate other information based on the search query term 904. For example, as illustrated in FIG. 9, the topic tracking system 106 causes the digital survey reporting structure to generate an indication of the best matching topic 910 (e.g., "Best Match: Website Functions") and the click to track option 914, the click to notify option 916, and the click to view survey responses option 918. Indeed, the topic tracking system 106 can track the best matching topic 910 (e.g., "website functions") upon receiving an indication of a selection of the click to track option 914 in accordance with one or more embodiments herein. Furthermore, the topic tracking system 106 can generate (and/or distribute) notifications based on the best matching topic 910 (e.g., "website functions") upon receiving an indication of a selection of the click to notify option 916 in accordance with one or more embodiments herein. Furthermore, upon receiving an indication of a selection of the click to view survey responses option 918, the topic tracking system 106 can cause the digital survey reporting structure to display (or provide) one or more digital responses corresponding to the best matching topic 910 to the administrator device 110.

Figure 10:
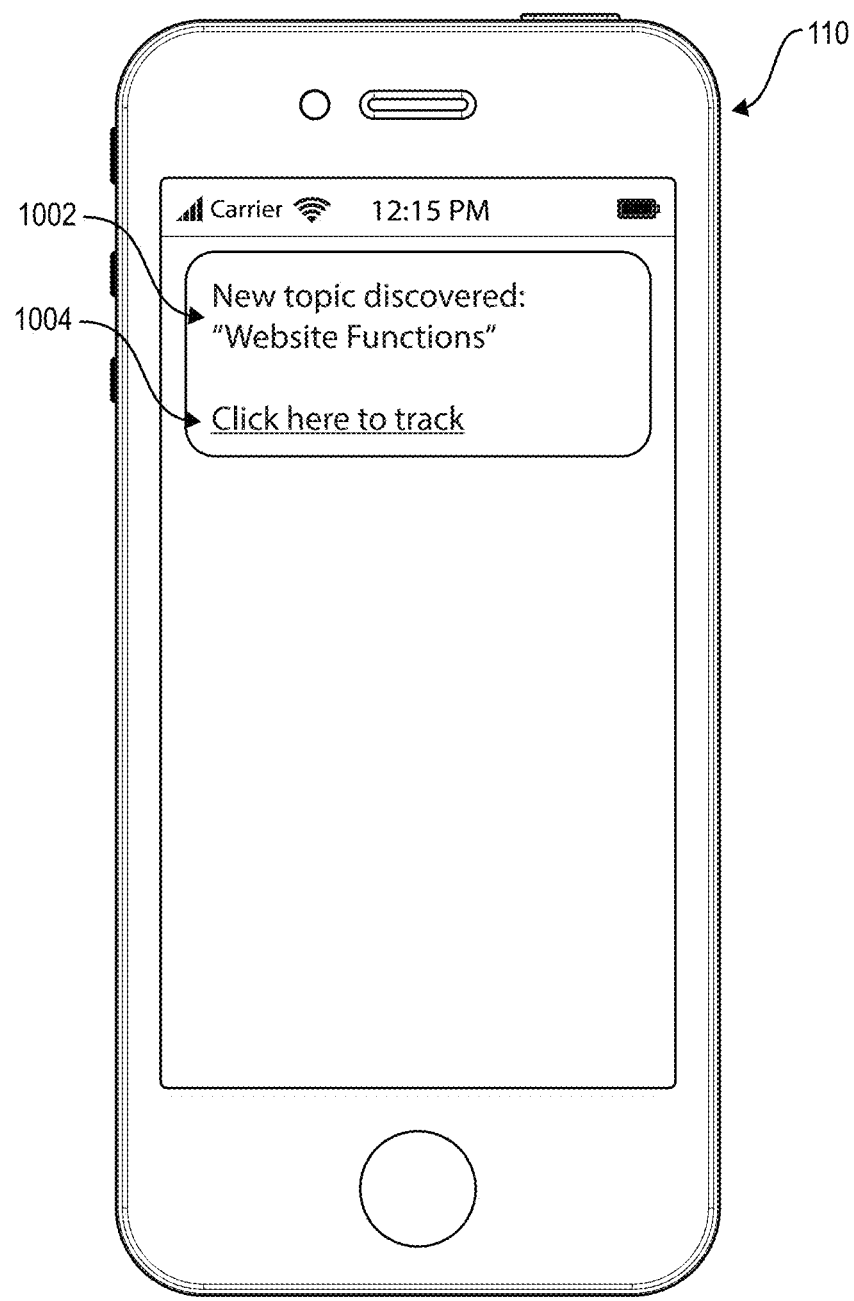
FIG. 10 illustrates a notification generated by a topic tracking system in accordance with one or more embodiments.

As mentioned above, the topic tracking system 106 can generate (and/or distribute) a notification based on a topic variance as an interactive notification. For example, FIG. 10 illustrates an interactive notification that is generated (and/or distributed) by the topic tracking system 106 based on a topic variance. As shown in FIG. 10, the topic tracking system 106 can distribute an interactive notification 1002 that includes a selectable option 1004 on the administrator device 110. In particular, as illustrated in FIG. 10, upon identifying a topic variance (e.g., the emerging topic of "Website Functions"), the topic tracking system 106 can generate and distribute the interactive notification 1002 that includes the selectable option 1004 based on the topic variance to the administrator device 110. Indeed, the topic tracking system 106 can receive an interaction from the administrator device 110 (e.g., a selection of the selectable option 1004) and modify the digital survey reporting structure based on the selection of the selectable option in accordance with one or more embodiments herein. For instance, as shown in FIG. 10, the topic tracking system 106 can receive an indication of a selection of selectable option 1004 from the administrator device 110 and cause the digital survey reporting structure to track the topic of "website functions" (based on the content of the interactive notification 1002). Although FIG. 10 illustrates a selectable option to track a topic, the topic tracking system 106 can generate (and/or distribute) various selectable options for various actions in accordance with one or more embodiments herein.

Figure 11:
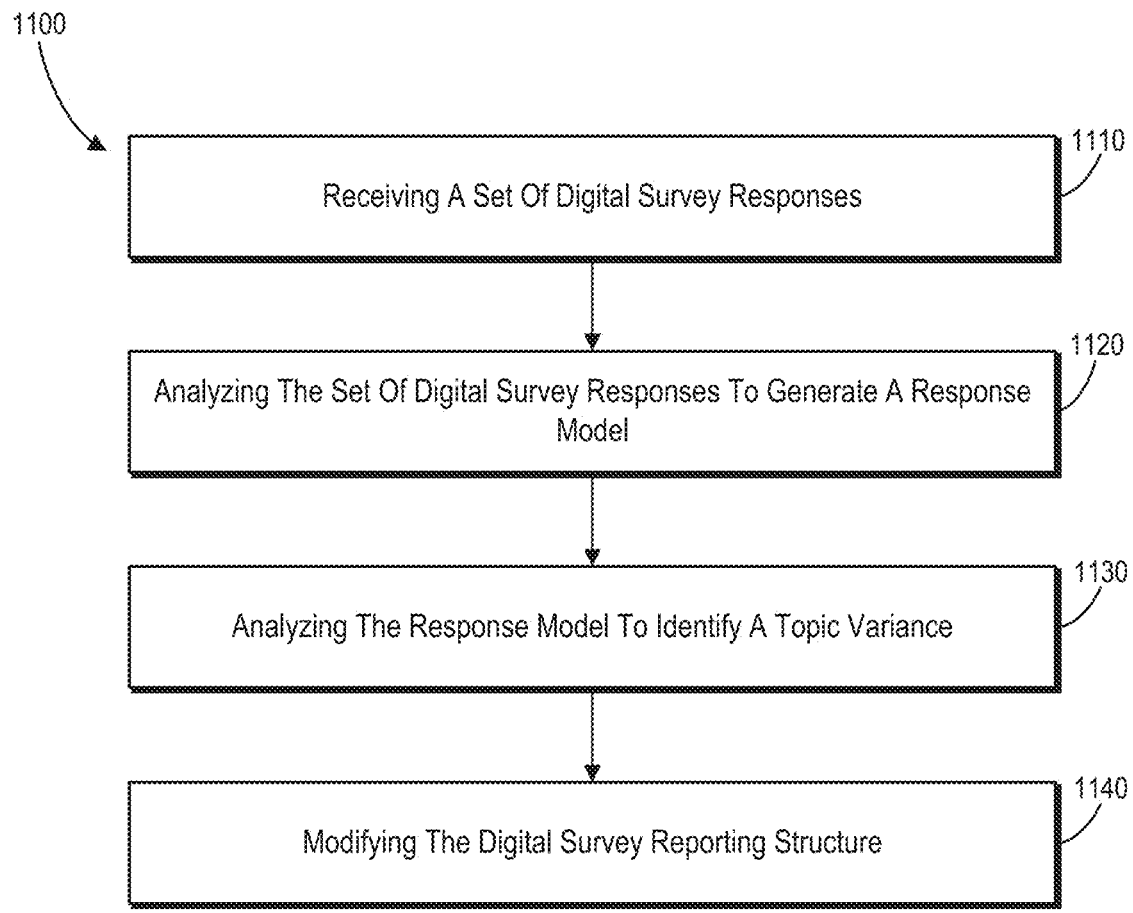
FIG. 11 illustrates a flowchart of a series of acts for identifying a topic variance and modifying a digital survey reporting structure based on the topic variance in accordance with one or more embodiments.

FIGS. 1-10, the corresponding text, and the examples provide a number of different methods, systems, devices, and non-transitory computer-readable media of the topic tracking system 106. In addition to the foregoing, one or more embodiments can also be described in terms of flowcharts comprising acts for accomplishing a particular result, as shown in FIG. 11. FIG. 11 may be performed with more or fewer acts. Further, the acts may be performed in differing orders. Additionally, the acts described herein may be repeated or performed in parallel with one another or parallel with different instances of the same or similar acts.

As mentioned above, FIG. 11 illustrates a flowchart of a series of acts 1100 for identifying a topic variance and modifying a digital survey reporting structure based on the topic variance in accordance with one or more embodiments. While FIG. 11 illustrates acts according to one embodiment, alternative embodiments may omit, add to, reorder, and/or modify any of the acts shown in FIG. 11. The acts of FIG. 11 can be performed as part of a method. Alternatively, a non-transitory computer-readable medium can comprise instructions that, when executed by one or more processors, cause a computing device to perform the acts of FIG. 11. In some embodiments, a system can perform the acts of FIG. 11.

As shown in FIG. 11, the series of acts 1100 includes an act 1110 of receiving a set of digital survey responses. In particular, act 1110 can include receiving a first set of digital survey responses corresponding to a first time period. Additionally, act 1110 can include receiving a second set of digital survey responses corresponding to a second time period.

As further shown in FIG. 11, the series of acts 1100 includes an act 1120 of analyzing the set of digital survey responses to generate a response model. In particular, act 1120 can include analyzing the first set of digital survey responses to generate a first response model for the first set of digital survey responses. For example, act 1120 can include analyzing the first set of digital survey responses to generate the first response model by identifying response attributes associated with each digital survey response from the first set of digital survey responses. For example, the response attributes associated with each digital survey response from the first set of digital survey responses can include one or more sentiment values or one or more topic labels. Furthermore, act 1120 can include analyzing the first set of digital survey responses to generate the first response model by generating a first set of clusters. For instance, the first set of clusters can represent relations between words associated with the first set of survey responses.

In addition, act 1120 can include analyzing the second set of digital survey responses to generate a second response model for the second set of digital survey responses. Additionally, act 1120 can include analyzing the second set of digital survey responses to generate the second response model by identifying response attributes associated with each digital survey response from the second set of digital survey responses. For example, the response attributes associated with each digital survey response from the second set of digital survey responses can include one or more sentiment values or one or more topic labels. Furthermore, act 1120 can include analyzing the second set of digital survey responses to generate the second response model by generating a second set of clusters. For example, the second set of clusters can represent relations between words associated with the second set of survey responses.

As further shown in FIG. 11, the series of acts 1100 includes an act 1130 of analyzing the response model to identify a topic variance. In particular, act 1130 can include analyzing the first response model and the second response model to identify a topic variance. Furthermore, act 1130 can include analyzing the first response model and the second response model by comparing the first response model and second response model to identify the topic variance. For example, the topic variance can include at least one of an emerging topic, a change in trend for a topic, or a change in sentiment for a topic.

As further shown in FIG. 11, the series of acts 1100 includes an act 1140 of modifying the digital survey reporting structure. In particular, act 1140 can include modifying a digital survey reporting structure, associated with the first set of digital survey responses and the second set of digital survey responses, based on the topic variance. Furthermore, act 1140 can include modifying the digital survey reporting structure by tracking a topic associated with the topic variance. Furthermore, act 1140 can include generating a notification associated with the topic variance.

In addition, act 1140 can include modifying the digital survey reporting structure by generating a selectable option corresponding to the topic variance. Moreover, act 1140 can include modifying the digital survey reporting structure by providing the selectable option to a client device. Additionally, act 1140 can include modifying the digital survey reporting structure by receiving an indication of a selection of the selectable option from the client device. Furthermore, act 1140 can include modifying the digital survey reporting structure by tracking the topic variance in response to receiving the indication of the selection of the selectable option.

Figure 12:
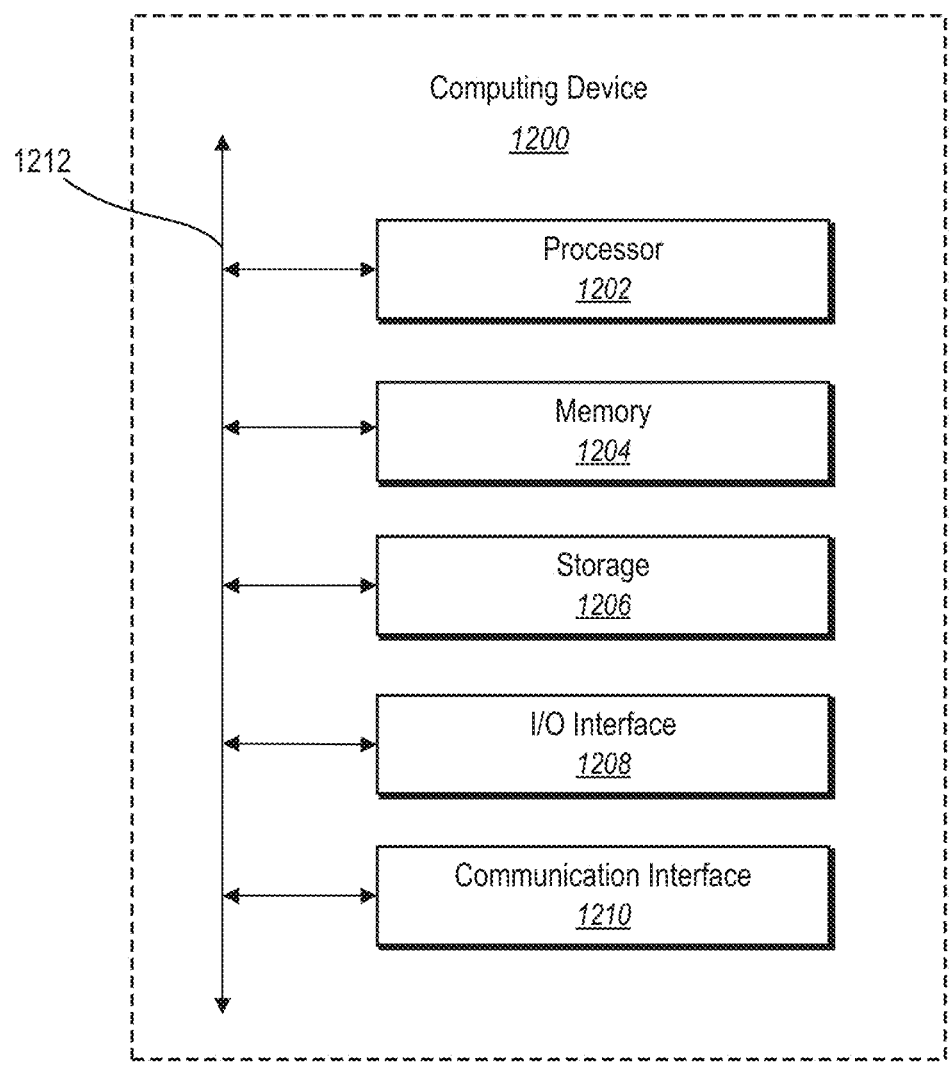
FIG. 12 illustrates a block diagram of a computing device in accordance with one or more embodiments.

FIG. 12 illustrates a block diagram of an example computing device 1200 that may be configured to perform one or more of the processes described above. One will appreciate that one or more computing devices such as the computing device 1200 may implement the server device(s) 102 and/or other devices described above in connection with FIG. 1. As shown by FIG. 12, the computing device 1200 can comprise a processor 1202, a memory 1204, a storage device 1206, an I/O interface 1208, and a communication interface 1210, which may be communicatively coupled by way of a communication infrastructure 1212. While the example computing device 1200 is shown in FIG. 12, the components illustrated in FIG. 12 are not intended to be limiting. Additional or alternative components may be used in other embodiments. Furthermore, in certain embodiments, the computing device 1200 can include fewer components than those shown in FIG. 12. Components of the computing device 1200 shown in FIG. 12 will now be described in additional detail.

In one or more embodiments, the processor 1202 includes hardware for executing instructions, such as those making up a computer program. As an example, and not by way of limitation, to execute instructions, the processor 1202 may retrieve (or fetch) the instructions from an internal register, an internal cache, the memory 1204, or the storage device 1206 and decode and execute them. In one or more embodiments, the processor 1202 may include one or more internal caches for data, instructions, or addresses. As an example, and not by way of limitation, the processor 1202 may include one or more instruction caches, one or more data caches, and one or more translation lookaside buffers ("TLBs"). Instructions in the instruction caches may be copies of instructions in the memory 1204 or the storage device 1206.

The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The storage device 1206 includes storage for storing data or instructions. As an example and not by way of limitation, storage device 1206 can comprise a non-transitory computer readable medium (or a non-transitory storage medium) described above. The storage device 1206 may include a hard disk drive ("HDD"), a floppy disk drive, flash memory, an optical disc, a magneto-optical disc, magnetic tape, or a Universal Serial Bus ("USB") drive or a combination of two or more of these. The storage device 1206 may include removable or non-removable (or fixed) media, where appropriate. The storage device 1206 may be internal or external to the computing device 1200. In one or more embodiments, the storage device 1206 is non-volatile, solid-state memory. In other embodiments, the storage device 1206 includes read-only memory ("ROM"). Where appropriate, this ROM may be mask programmed ROM, programmable ROM ("PROM"), erasable PROM ("EPROM"), electrically erasable PROM ("EEPROM"), electrically alterable ROM ("EAROM"), or flash memory or a combination of two or more of these.

The I/O interface 1208 allows a user to provide input to, receive output from, and otherwise transfer data to and receive data from the computing device 1200. The I/O interface 1208 may include a mouse, a keypad or a keyboard, a touch screen, a camera, an optical scanner, network interface, modem, other known I/O devices or a combination of such I/O interfaces. The I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1208 is configured to provide graphical data to a display for presentation to a user. The graphical data may be representative of one or more graphical user interfaces and/or any other graphical content as may serve a particular implementation.

The communication interface 1210 can include hardware, software, or both. In any event, the communication interface 1210 can provide one or more interfaces for communication (such as, for example, packet-based communication) between the computing device 1200 and one or more other computing devices or networks. As an example and not by way of limitation, the communication interface 1210 may include a network interface controller ("NIC") or network adapter for communicating with an Ethernet or other wire-based network or a wireless NIC ("WNIC") or wireless adapter for communicating with a wireless network, such as a WI-FI.

Additionally, or alternatively, the communication interface 1210 may facilitate communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks may be wired or wireless. As an example, the communication interface 1210 may facilitate communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

The communication infrastructure 1212 may include hardware, software, or both that couples components of the computing device 1200 to each other. As an example and not by way of limitation, the communication infrastructure 1212 may include an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus or a combination thereof.

Figure 13:
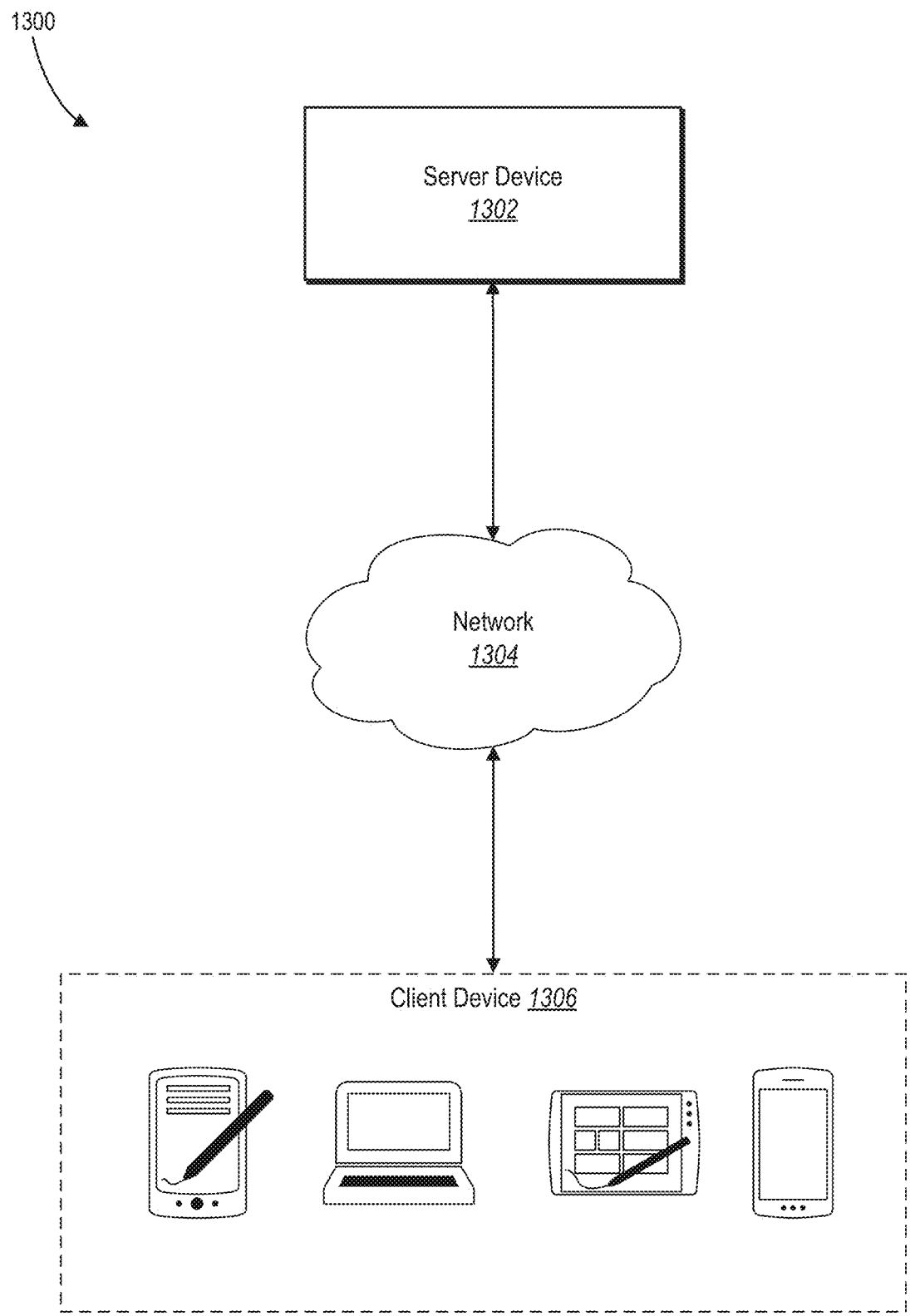
FIG. 13 illustrates a network environment of a topic tracking system in accordance with one or more embodiments.

FIG. 13 illustrates an example network environment 1300 of the environment 100. Network environment 1300 includes a client device 1306, and a server device 1302 connected to each other by a network 1304. Although FIG. 13 illustrates a particular arrangement of client device 1306, server device 1302, and network 1304, this disclosure contemplates any suitable arrangement of client device 1306, server device 1302, and network 1304. As an example and not by way of limitation, two or more of client device 1306, and server device 1302 may be connected to each other directly, bypassing network 1304. As another example, two or more of client device 1306 and server device 1302 may be physically or logically co-located with each other in whole, or in part. Moreover, although FIG. 13 illustrates a particular number of client devices 1306, server devices 1302, and networks 1304, this disclosure contemplates any suitable number of client devices 1306, server devices 1302, and networks 1304. As an example and not by way of limitation, network environment 1300 may include multiple client devices 1306, server devices 1302, and networks 1304.

This disclosure contemplates any suitable network 1304. As an example and not by way of limitation, one or more portions of network 1304 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 1304 may include one or more networks 1304.

Links may connect client device 1306, and server device 1302 to communication network 1304 or to each other. This disclosure contemplates any suitable links. In particular embodiments, one or more links include one or more wireline (such as for example Digital Subscriber Line ("DSL") or Data Over Cable Service Interface Specification ("DOCSIS")), wireless (such as for example Wi-Fi or Worldwide Interoperability for Microwave Access ("WiMAX")), or optical (such as for example Synchronous Optical Network (SONET) or Synchronous Digital Hierarchy ("SDH")) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1300. One or more first links may differ in one or more respects from one or more second links.

In particular embodiments, client device 1306 may be an electronic device including hardware, software, or embedded logic components or a combination of two or more such components and capable of carrying out the appropriate functionalities implemented or supported by client device 1306. As an example and not by way of limitation, a client device 1306 may include any of the computing devices discussed above in relation to FIG. 13. A client device 1306 may enable a network user at client device 1306 to access network 1304.

In particular embodiments, client device 1306 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1306 may enter a Uniform Resource Locator ("URL") or other address directing the web browser to a particular server (such as server, or a server associated with a third-party system), and the web browser may generate a Hyper Text Transfer Protocol ("HTTP") request and communicate the HTTP request to server. The server may accept the HTTP request and communicate to client device 1306 one or more Hyper Text Markup Language ("HTML") files responsive to the HTTP request. Client device 1306 may render a webpage based on the HTML files from the server for presentation to the user. This disclosure contemplates any suitable webpage files. As an example and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1302 may include a variety of servers, sub-systems, programs, modules, logs, and data stores. In particular embodiments, server device 1302 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1302 may also include suitable components such as network interfaces, security mechanisms, load balancers, failover servers, management-and-network-operations consoles, other suitable components, or any suitable combination thereof.

In particular embodiments, server device 1302 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. Additionally, a user profile may include financial and billing information of users (e.g., survey respondents, customers, etc.).

The foregoing specification is described with reference to specific example embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving, by at least one processor, a first set of digital survey text responses corresponding to a first time period;
analyzing, by the at least one processor, the first set of digital survey text responses to generate a first response cluster model for the first set of digital survey text responses by generating a first set of clusters;
receiving, by the at least one processor, a second set of digital survey text responses corresponding to a second time period;
analyzing, by the at least one processor, the second set of digital survey text responses to generate a second response cluster model for the second set of digital survey text responses by generating a second set of clusters;
analyzing, by the at least one processor, the first set of clusters of the first response cluster model and the second set of clusters of the second response cluster model to identify a topic variance comprising an emerging topic that represents a new topic that is present in the second time period and not present in the first time period; and
in response to identifying the topic variance:
automatically initiating an action for tracking ongoing information corresponding to the emerging topic from subsequent digital survey responses of a digital survey reporting structure;
modifying the digital survey reporting structure to transmit an electronic communication based on the emerging topic; and
providing, for display within a graphical user interface of a client device, one or more digital survey reports generated utilizing the ongoing information corresponding to the emerging topic.

2. The computer-implemented method of claim 1, wherein:
analyzing the first set of digital survey text responses to generate the first response cluster model comprises identifying response attributes associated with each digital survey text response from the first set of digital survey text responses; and
analyzing the second set of digital survey text responses to generate the second response cluster model comprises identifying response attributes associated with each digital survey text response from the second set of digital survey text responses.

3. The computer-implemented method of claim 2, wherein:
analyzing the first set of digital survey text responses to generate the first response cluster model comprises generating the first set of clusters to represent relations between words associated with the first set of digital survey text responses; and
analyzing the second set of digital survey text responses to generate the second response cluster model comprises generating the second set of clusters to represent relations between words associated with the second set of digital survey text responses.

4. The computer-implemented method of claim 3, wherein analyzing the first response cluster model and the second response cluster model to identify the topic variance comprises comparing the first response cluster model and the second response cluster model to identify the topic variance from changes between the first set of clusters and the second set of clusters.

5. The computer-implemented method of claim 1, further comprising generating the one or more digital survey reports to display sentiment values determined for the emerging topic.

6. The computer-implemented method of claim 5, further comprising transmitting the electronic communication based on the emerging topic to a digital survey respondent associated with the emerging topic.

7. The computer-implemented method of claim 1, further comprising generating the first set of clusters utilizing natural language processing or machine learning with the first set of digital survey text responses.

8. The computer-implemented method of claim 1, further comprising tracking the ongoing information corresponding to the emerging topic from the subsequent digital survey responses by tracking subsequent mentions of the emerging topic or determining sentiment values for the emerging topic.

9. The computer-implemented method of claim 2, wherein the response attributes associated with each digital survey text response from the first set of digital survey text responses comprise one or more sentiment values or one or more topic labels.

10. The computer-implemented method of claim 2, wherein the topic variance further comprises at least one of a change in trend for the emerging topic or a change in sentiment for the emerging topic.

11. A system comprising:
at least one processor; and
at least one non-transitory computer-readable storage medium storing instructions that, when executed by the at least one processor, cause the system to:
receive a first set of digital survey text responses corresponding to a first time period;
analyze the first set of digital survey text responses to generate a first response cluster model for the first set of digital survey text responses by generating a first set of clusters;
receive a second set of digital survey text responses corresponding to a second time period;
analyze the second set of digital survey text responses to generate a second response cluster model for the second set of digital survey text responses by generating a second set of clusters;
analyze the first set of clusters of the first response cluster model and the second set of clusters of the second response cluster model to identify a topic variance comprising an emerging topic that represents a new topic that is present in the second time period and not present in the first time period; and
in response to identifying the topic variance:
automatically initiating an action for tracking ongoing information corresponding to the emerging topic from subsequent digital survey responses of a digital survey reporting structure;
modifying the digital survey reporting structure to transmit an electronic communication based on the emerging topic; and
providing, for display within a graphical user interface of a client device, one or more digital survey reports generated utilizing the ongoing information corresponding to the emerging topic.

12. The system of claim 11, wherein:

analyzing the first set of digital survey text responses to generate the first response cluster model comprises identifying response attributes associated with each digital survey text response from the first set of digital survey text responses; and analyzing the second set of digital survey text responses to generate the second response cluster model comprises identifying response attributes associated with each digital survey text response from the second set of digital survey text responses.

13. The system of claim 12, wherein:

analyzing the first set of digital survey text responses to generate the first response cluster model comprises generating the first set of clusters to represent relations between words associated with the first set of digital survey text responses; and analyzing the second set of digital survey text responses to generate the second response cluster model comprises generating the second set of clusters to represent relations between words associated with the second set of digital survey text responses.

14. The system of claim 13, further comprising instructions that, when executed by the at least one processor, cause the system to compare the first response cluster model and the second response cluster model to identify the topic variance between the first set of clusters and the second set of clusters, wherein the topic variance comprises at least one of a change in trend for the emerging topic or a change in sentiment for the emerging topic.

15. The system of claim 11, further comprising modifying the digital survey reporting structure to transmit an electronic communication based on the emerging topic.

16. The system of claim 11, further comprising instructions that, when executed by the at least one processor, cause the system to generate a notification associated with the topic variance.

17. A non-transitory computer-readable medium storing instructions that, when executed by at least one processor, cause a computing device to:

receive a first set of digital survey text responses corresponding to a first time period;

analyze the first set of digital survey text responses to generate a first response cluster model for the first set of digital survey text responses by generating a first set of clusters;

receive a second set of digital survey text responses corresponding to a second time period;

analyze the second set of digital survey text responses to generate a second response model for the second set of digital survey text responses;

analyze the first set of clusters of the first response cluster model and the second set of clusters of the second response cluster model to identify a topic variance comprising an emerging topic that represents a new topic that is present in the second time period and not present in the first time period; and in response to identifying the topic variance:
  automatically initiating an action for tracking ongoing information corresponding to the emerging topic from subsequent digital survey responses of a digital survey reporting structure;
  modifying the digital survey reporting structure to transmit an electronic communication based on the emerging topic; and
  providing, for display within a graphical user interface of a client device, one or more digital survey reports generated utilizing the ongoing information corresponding to the emerging topic.

18. The non-transitory computer-readable medium of claim 17, further comprising instructions that, when executed by the at least one processor, cause the computing device to generate a notification associated with the topic variance.

19. The non-transitory computer-readable medium of claim 17, further comprising modifying the digital survey reporting structure to transmit an electronic communication based on the emerging topic.

20. The non-transitory computer-readable medium of claim 17, further comprising instructions that, when executed by the at least one processor, cause the computing device to:

analyze the first set of digital survey text responses to generate the first response cluster model comprises generating the first set of clusters to represent relations between words associated with the first set of digital survey text responses; and analyze the second set of digital survey text responses to generate the second response cluster model comprises generating the second set of clusters to represent relations between words associated with the second set of digital survey text responses.

* * * * *